US008523738B2

(12) United States Patent
Morscheck et al.

(10) Patent No.: US 8,523,738 B2
(45) Date of Patent: Sep. 3, 2013

(54) METHOD OF SHIFTING A TANDEM DRIVE AXLE HAVING AN INTER-AXLE DIFFERENTIAL

(75) Inventors: Timothy J. Morscheck, Portage, MI (US); Kenneth E. Cooper, Toledo, OH (US); James F. Ziech, Kalamazoo, MI (US); Richard A. Nellums, Maumee, OH (US); Steven J. Wesolowski, Waterville, OH (US); Donald J. Remboski, Ann Arbor, MI (US)

(73) Assignee: Dana Heavy Vehicle Systems Group, LLC, Maumee, OH (US)

( * ) Notice: Subject to any disclaimer, the term of this patent is extended or adjusted under 35 U.S.C. 154(b) by 55 days.

(21) Appl. No.: 13/353,944

(22) Filed: Jan. 19, 2012

(65) Prior Publication Data

US 2013/0017927 A1    Jan. 17, 2013

Related U.S. Application Data

(60) Provisional application No. 61/435,007, filed on Jan. 21, 2011.

(51) Int. Cl.
*B60W 10/00* (2006.01)

(52) U.S. Cl.
USPC .............. 477/77; 477/36; 477/110; 475/221; 475/332

(58) Field of Classification Search
USPC .............. 477/35, 36, 77, 107, 110; 475/221, 475/223, 332, 343
See application file for complete search history.

(56) References Cited

U.S. PATENT DOCUMENTS

| 2,166,099 A | 12/1937 | Quartullo |
|---|---|---|
| 2,291,174 A | 3/1939 | Stewart |
| 2,290,089 A | 7/1942 | Bock |
| 2,574,986 A | 10/1947 | Schou |
| 2,936,036 A | 5/1960 | Norelius |
| 3,146,842 A | 9/1964 | Nelson et al. |
| 3,221,832 A | 12/1965 | Holmstrom |
| 3,324,965 A | 6/1967 | Koch et al. |
| 3,388,760 A | 6/1968 | Christie |
| 3,577,804 A | 5/1971 | Ohno |
| 3,657,935 A | 4/1972 | O'Brien |
| 3,706,350 A | 12/1972 | Bokovoy |
| 3,792,628 A | 2/1974 | Stieg |
| 3,827,520 A | 8/1974 | Mueller |

(Continued)

FOREIGN PATENT DOCUMENTS

| CN | 201346995 Y | 1/2009 |
|---|---|---|
| EP | 1 527 938 A2 | 5/2005 |

(Continued)

*Primary Examiner* — Justin Holmes
(74) *Attorney, Agent, or Firm* — Marshall & Melhorn LLC

(57) ABSTRACT

A method of shifting a power distribution unit for a vehicle from a first operating state to a second operating state is provided. The method includes the step of adjusting a rotational speed of a portion of a second axle assembly using a clutching device to impart energy to a lubricant within the second axle assembly. A controller in communication with a power source of the vehicle adjusts an operating condition of the power source to facilitate moving the clutching device. The power distribution unit includes an inter-axle differential capable being placed in a locked condition by the clutching device and of accommodating a rotational difference between a first output gear and a second output gear with the inter-axle differential.

44 Claims, 4 Drawing Sheets

(56) References Cited

U.S. PATENT DOCUMENTS

| | | | | |
|---|---|---|---|---|
| 3,915,032 | A | 10/1975 | Ottemann | |
| 3,916,728 | A | 11/1975 | Behar et al. | |
| 3,976,154 | A | 8/1976 | Clark et al. | |
| 4,046,210 | A | 9/1977 | Nelson | |
| 4,050,534 | A | 9/1977 | Nelson et al. | |
| 4,194,586 | A | 3/1980 | Hicks | |
| 4,263,824 | A | 4/1981 | Mueller | |
| 4,432,431 | A | 2/1984 | Russell | |
| 4,462,271 | A | 7/1984 | Stieg | |
| 4,560,018 | A | 12/1985 | Satzler | |
| 4,677,873 | A | 7/1987 | Eastman et al. | |
| 4,754,847 | A | 7/1988 | Glaze et al. | |
| 4,779,699 | A * | 10/1988 | Hatano | 180/248 |
| 4,887,487 | A | 12/1989 | Mayfield | |
| 5,176,590 | A | 1/1993 | Haydock | |
| 5,267,489 | A | 12/1993 | Ziech | |
| 5,370,018 | A | 12/1994 | Kwasniewski | |
| 5,435,790 | A | 7/1995 | Kota et al. | |
| 5,641,044 | A | 6/1997 | Morscheck | |
| 5,651,748 | A | 7/1997 | Adam et al. | |
| 5,711,389 | A | 1/1998 | Schlosser | |
| 5,860,889 | A | 1/1999 | Schlosser et al. | |
| 5,876,301 | A * | 3/1999 | Tabata et al. | 477/109 |
| 5,950,750 | A | 9/1999 | Dong et al. | |
| 6,085,853 | A | 7/2000 | Wernick | |
| 6,154,700 | A | 11/2000 | Jones | |
| 6,258,009 | B1 | 7/2001 | Thomas et al. | |
| 6,327,935 | B1 | 12/2001 | Joslin et al. | |
| 6,517,462 | B2 | 2/2003 | Borgan et al. | |
| 6,530,861 | B1 | 3/2003 | Nakashima | |
| 6,659,249 | B2 | 12/2003 | Borgen et al. | |
| 6,840,880 | B2 | 1/2005 | Glassner | |
| 6,863,634 | B2 | 3/2005 | Holman et al. | |
| 6,877,573 | B2 | 4/2005 | Hasegawa | |
| 6,918,851 | B2 | 7/2005 | Ziech et al. | |
| 6,926,634 | B2 | 8/2005 | Haka | |
| 6,932,734 | B2 * | 8/2005 | Hwa et al. | 475/221 |
| 6,953,411 | B2 | 10/2005 | Burns et al. | |
| 6,964,310 | B2 | 11/2005 | Hasegawa | |
| 7,044,880 | B2 * | 5/2006 | Bowen | 475/205 |
| 7,093,681 | B2 | 8/2006 | Strain | |
| 7,096,990 | B2 | 8/2006 | Borgen et al. | |
| 7,163,483 | B2 | 1/2007 | Haka | |
| 7,195,579 | B2 | 3/2007 | Claussen et al. | |
| 7,291,083 | B2 | 11/2007 | Almaguer | |
| 7,306,536 | B2 | 12/2007 | Ziech | |
| 7,399,251 | B2 | 7/2008 | Mueller et al. | |
| 7,410,440 | B2 | 8/2008 | Garcia et al. | |
| 7,491,145 | B2 | 2/2009 | Mizon et al. | |
| 7,611,414 | B2 | 11/2009 | Mueller et al. | |
| 7,686,728 | B2 | 3/2010 | Imbert | |
| 2006/0172852 | A1 * | 8/2006 | Claussen et al. | 477/35 |
| 2006/0272866 | A1 | 12/2006 | Ziech | |
| 2008/0210508 | A1 | 9/2008 | Heisey et al. | |
| 2010/0206654 | A1 | 8/2010 | Cimatti et al. | |
| 2010/0248888 | A1 | 9/2010 | Hamperl et al. | |

FOREIGN PATENT DOCUMENTS

| | | |
|---|---|---|
| JP | 58-076330 A | 5/1983 |
| JP | 8-2280 A | 9/1996 |
| JP | 8-337125 A | 12/1996 |
| KR | 20030000505 A | 1/2003 |
| WO | WO 2008019779 A2 | 2/2008 |
| WO | WO 2008113484 A1 | 9/2008 |

* cited by examiner

METHOD OF SHIFTING A TANDEM DRIVE AXLE HAVING AN INTER-AXLE DIFFERENTIAL

CLAIM OF PRIORITY

The present application claims priority to and incorporates by reference U.S. Provisional Application No. 61/435,007 filed Jan. 21, 2011, entitled "Two Speed Tandem Drive Axle Having an Inter-Axle Differential."

FIELD OF THE INVENTION

The present invention relates to a vehicle drive train and to a method of shifting a tandem drive axle for the vehicle drive train having an inter-axle differential from a first operating state to a second operating state.

BACKGROUND OF THE INVENTION

Vehicles incorporating tandem drive axles benefit in many ways over vehicles having a single driven axle. Inter-axle differentials in such vehicles may be configured to distribute torque proportionately or disproportionately between the axles. Additionally, shift mechanisms may be provided to such vehicles to permit the disengagement of one of the driven axles or to transition from single axle operation to tandem axle operation, among other benefits. However, such versatility typically requires the incorporation of additional drive train components into the vehicle at added expense and weight. Such added weight results in a decreased fuel efficiency of the vehicle.

Components of the tandem drive axle may also be selected based on a gear reduction ratio present in an axle. Axle ratios may be of a two-speed configuration to permit the vehicle to operate in a low speed and high torque manner or in a high speed and low torque manner. It is preferred to drive both axles when the low speed and high torque manner of operation is desired (to distribute the higher torque amongst a greater number of wheels) and it is advantageous to operate a single axle when the high speed and low torque manner of operation is desired (to decrease windage and frictional losses when torque distribution is of lower concern). However, incorporation of both the two-speed configuration, an axle disconnect function, and the inter axle differential may be prohibitive with respect to cost and weight. Such added weight, windage losses, and frictional losses result in a decreased fuel efficiency of the vehicle.

Additionally, when components are provided to permit the disengagement of one of the driven axles or to transition from the vehicle from single axle operation to tandem axle operation, a complexity of the tandem drive axle is increased. Typically, such operations may require manual engagement by an operator when specific conditions are present or may require the operator to stop the vehicle to engage specific components. Such features, while providing additional functionality to the vehicle, may not be properly implemented by the operator or may not be used at all by the operator. When such features are not properly implemented, a shift from one operating state to another may result in damage to the tandem drive axle or a rough shift, either of which typically result in a dissatisfaction of the operator.

It would be advantageous to develop a method of shifting a tandem drive axle system from a low speed and high torque tandem axle manner of operation to a high speed and low torque single axle manner of operation that reduces windage and frictional losses and facilitates improved shifting from one operating state to another without excessively increasing a cost and a weight of the tandem drive axle.

SUMMARY OF THE INVENTION

Presently provided by the invention, a method of shifting a tandem drive axle system from a low speed and high torque tandem axle manner of operation to a high speed and low torque single axle manner of operation that reduces windage and frictional losses and facilitates improved shifting from one operating state to another without excessively increasing a cost and a weight of the tandem drive axle, has surprisingly been discovered.

In one embodiment, the present invention is directed to a method of shifting a power distribution unit for a vehicle from a first operating state to a second operating state. The method includes the steps of drivingly engaging a first axle assembly with a first output of the power distribution unit and drivingly engaging a second axle assembly with a second output of the power distribution unit. Next, the method includes the step of drivingly engaging an input of the power distribution unit with an output of a power source, the power distribution unit including an inter-axle differential, the first output, the second output, and a first clutching device having a first position and a second position, the first clutching device in the first position locking the inter-axle differential, engaging the first output with the input of the power distribution unit, and disengaging the second output from the inter-axle differential, the first clutching device in the second position unlocking the inter-axle differential and engaging the first output and the second output with the inter-axle differential. Next, the method includes the steps of placing the first clutching device in one of the first position and the second position and applying a rotational force to the input of the power distribution unit. Next, the method includes the steps of adjusting the rotational force transferred to the power distribution unit to facilitate moving the first clutching device and moving the first clutching device from one of the first position and the second position to a third position, the first clutching device in the third position neither locking the inter-axle differential nor engaging the second output with the inter-axle differential. Lastly, the method includes the steps of adjusting a rotational speed of the input of the power distribution unit to facilitate moving the first clutching device from the third position, moving the first clutching device from the third position to one of the first and second positions, and adjusting the rotational force transferred to the power distribution unit.

Various aspects of this invention will become apparent to those skilled in the art from the following detailed description of the preferred embodiment, when read in light of the accompanying drawings.

BRIEF DESCRIPTION OF THE DRAWINGS

The above, as well as other advantages of the present invention, will become readily apparent to those skilled in the art from the following detailed description when considered in the light of the accompanying drawings in which.

DETAILED DESCRIPTION OF THE INVENTION

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions, directions or other physical characteristics relating to the embodiments disclosed are not to be considered as limiting, unless the claims expressly state otherwise.

Figure 1:
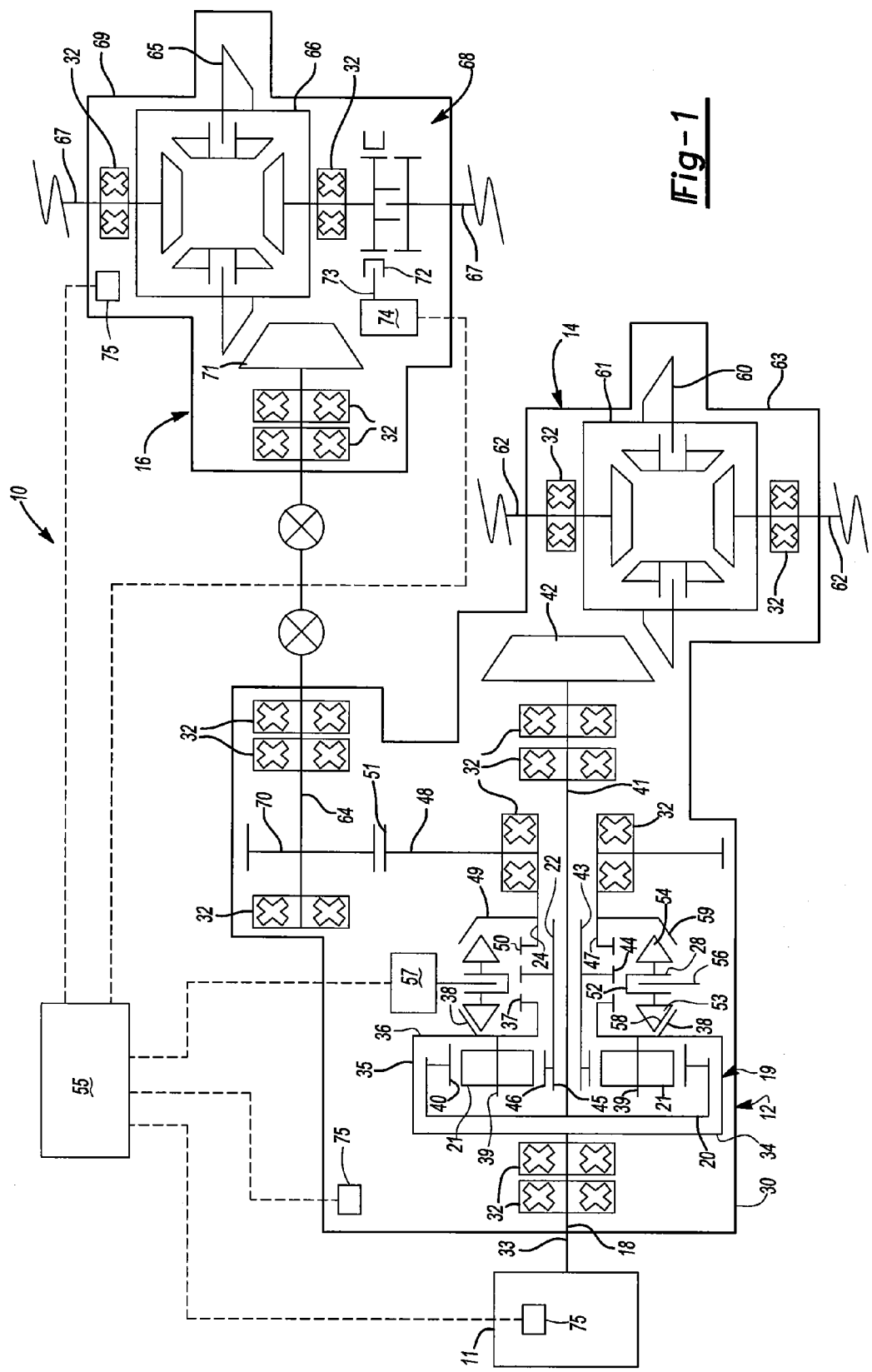
FIG. 1 is a schematic view of a tandem drive axle system including a power distribution unit according to an embodiment of the present invention.

FIG. 1 illustrates a drive axle system 10 for a vehicle having a power source 11. The drive axle system 10 preferably includes a power distribution unit 12, a first axle assembly 14, and a second axle assembly 16. The drive axle system 10 is drivingly engaged with a power source 11. As shown, the drive axle system 10 includes the three assemblies 12, 14, 16, but it is understood the drive axle system 10 may include fewer or more assemblies or components.

The power source 11 is drivingly engaged with an input shaft 18 of the power distribution unit 12, and applies power thereto. The power source 11 is, for example, an internal combustion engine; however, it is understood that the power source 11 may include an electric motor or another source of rotational output. It is understood that the power source 11 may be a hybrid power source including both an internal combustion engine and an electric motor. Further, it is understood that the power source 11 may include a transmission (not shown) as known in the art. Further, it is understood that the power source 11 may include a clutch (not shown) as known in the art, for one of reducing and interrupting a rotational force transferred to the power distribution unit 12.

The power distribution unit 12 includes an input shaft 18, an inter-axle differential 19, a first output gear 20, a plurality of driving pinions 21, a transfer shaft 22, a second output gear 24, and a clutch 28. Preferably, the components 18, 19, 20, 21, 22, 24, 28 are formed from a hardened steel, however the components 18, 19, 20, 21, 22, 24, 28 may be formed from any other rigid material. As shown, power distribution unit 12 includes the seven components 18, 19, 20, 21, 22, 24, 28 disposed in a housing 30 but it is understood the power distribution unit 12 may include fewer or more components.

The input shaft 18 is at least partially disposed in the housing 30. Preferably, the input shaft 18 is an elongate member, however the input shaft 18 may be any other shape. Bearings 32 disposed between the input shaft 18 and the housing 30 permit the input shaft 18 to rotate about an axis of the input shaft 18. The input shaft 18 has a first end portion 33, a middle portion 34, and a second end portion 35.

The middle portion 34 has a diameter greater than a diameter of the first end portion 33. The middle portion 34 is a substantially disc shaped body drivingly coupled to the input shaft 18. Alternately, the middle portion 34 may be integrally formed with the input shaft 18.

The second end portion 35 is a substantially hollow body having a diameter greater than a diameter of the first end portion 33 and the middle portion 34. The second end portion 35 is drivingly coupled to the middle portion 34. Alternately, the second end portion 35 may be integrally formed with the input shaft 18 and the middle portion 34. The second end portion 35 has a pinion carrier 36, a first set of clutch teeth 37, and an engagement portion 38 formed thereon.

The pinion carrier 36 is a substantially disc shaped body drivingly coupled to the second end portion 35 of the input shaft 18. The pinion carrier 36 includes a plurality of pinion supports 39 protruding from a first side of the pinion carrier 36 into the second end portion 35 of the input shaft 18. The engagement portion 38 is formed on a second side of the pinion carrier 36. As is known in the art, the pinion carrier 36 is also known as a planet carrier.

The engagement portion 38 is a conical surface oblique to the input shaft 18, however, the engagement portion 38 may have any other shape. The first set of clutch teeth 37 are formed on the pinion carrier 36 radially inward from the engagement portion 38.

The inter-axle differential 19 includes the pinion carrier 36, the plurality of driving pinions 21, the first output gear 20, and the transfer shaft 22. The inter-axle differential 19 is a planetary differential as known in the art; however, it is understood that the inter-axle differential 19 may be a bevel gear differential or any other type of differential.

The plurality of driving pinions 21 are rotatably disposed on the pinion supports 39 of the pinion carrier 36. Each of the driving pinions 21 have gear teeth formed on an outer surface thereof. As is known in the art, each of the driving pinions 21 is also known as a planet gear. Preferably, bearings are disposed between each of the driving pinions 21 and the pinion supports 39, however, the driving pinions 21 may be directly mounted on the pinion supports 39.

The first output gear 20 is a gear concentrically disposed within the second end portion 35 of the input shaft 18. The first output gear 20 is a substantially cup shaped body having an inner surface having gear teeth 40 formed on. As is known in the art, the first output gear 20 is known as a ring gear. The gear teeth 40 are engaged with the gear teeth formed on the outer surface of each of the driving pinions 21.

The first output gear 20 includes an output shaft 41 drivingly coupled thereto. Alternately, the first output gear 20 may be integrally formed with the output shaft 41. The first output gear 20 is drivingly engaged with the first axle assembly 14 through the output shaft 41. The output shaft 41 is collinear with the input shaft 18. Bearings 32 disposed between the output shaft 41 and the housing 30 support the output shaft 41 and permit the output shaft 41 to rotate about an axis of the output shaft 41.

A bevel gear pinion 42 is drivingly coupled to the output shaft 41 opposite the first output gear 20. Alternately, the bevel gear pinion 42 may be integrally formed with the output shaft 41. As is known in the art, the bevel gear pinion 42 has gear teeth formed on an outer surface thereof. The bevel gear pinion 42 may be one of a hypoid gear, a spiral bevel gear, a straight bevel gear, or any other gear known to those skilled in the art.

The transfer shaft 22 is a hollow shaft rotatably disposed in the housing 30 and having an axis of rotation concurrent with the axis of rotation of the input shaft 18. Preferably, the transfer shaft 22 is a hollow elongate cylindrical member, however the transfer shaft 22 may be any other shape. Bearings may be disposed between the transfer shaft 22 and pinion carrier 36 to permit the transfer shaft 22 to rotate about an axis of the transfer shaft 22. The transfer shaft 22 has a first end portion 43 having a first set of clutch teeth 44 formed on an outer surface thereof, and a second end portion 45, having a second set of gear teeth 46 formed on an outer surface thereof.

The first end portion 43 and the second end portion 45 are integrally formed with the transfer shaft 22. The first set of clutch teeth 44 and the second set of gear teeth 46 are formed in the transfer shaft 22. Alternately, the first end portion 43 and the second end portion 45 may be formed separate from and drivingly coupled to the transfer shaft 22. As is known in the art, the second end portion 45 having the gear teeth 46 is known as a sun gear. The second set of gear teeth 46 are engaged with the plurality of driving pinions 21 and the first set of clutch teeth 44 are disposed adjacent the first set of clutch teeth 37 of the pinion carrier 36. The first portion 43 of the transfer shaft 22 may be selectively engaged with the second output gear 24 or the pinion carrier 36

The second output gear 24 is a gear concentrically disposed about a portion of the transfer shaft 22. The second output gear 24 has a central perforation having a diameter greater than a diameter of the transfer shaft 22. The second output gear 24 is a substantially disc shaped body having a first end portion 47, a second end portion 48 defining an outer diameter of the second output gear 24, and an engagement portion 49. Bearings 32 disposed between the second output gear 24 and the housing 30 permit the second output gear 24 to rotate about an axis of the second output gear 24. The axis of the second output gear 24 is concurrent with the axis of the input shaft 18. A first set of clutch teeth 50 are formed on the first end portion 47 adjacent the first set of clutch teeth 44 of the transfer shaft 22. A second set of gear teeth 51 are formed on the second end portion 48. The second output gear 24 is drivingly engaged with the second axle assembly 16.

The engagement portion 49 is formed in the second output gear 24 intermediate the first end portion 47 and the second end portion 48. As shown, the engagement portion 49 is a conical surface oblique to the input shaft 18; however, the engagement portion 49 may have any other shape.

The clutch 28 is a shift collar concentrically disposed about the transfer shaft 22. The clutch 28 includes a set of inner clutch collar teeth 52 formed on an inner surface thereof, a first synchronizer 53, and a second synchronizer 54. The set of inner clutch collar teeth 52 are engaged with the first set of clutch teeth 44 of the transfer shaft 22. The clutch 28 can be slidably moved along the axis of the input shaft 18 as directed automatically by a controller 55 while maintaining engagement of the inner clutch collar teeth 52 and the first set of clutch teeth 44. A shift fork 56 disposed in an annular recess formed in the clutch 28 moves the clutch 28 along the axis of the input shaft 18 into a first position, a second position, or a third position. A first actuator 57, which is drivingly engaged with the shift fork 56, is engaged to position the shift fork 56 as directed by the controller 55. Consequently, the shift fork 56 positions the clutch 28 into the first position, the second position, or the third position. In the first position, the inner clutch collar teeth 52 of the clutch 28 are drivingly engaged with the first set of clutch teeth 44 of the transfer shaft 22 and the first set of clutch teeth 37 of the pinion carrier 36. In the second position, inner clutch collar teeth 52 of clutch 28 are drivingly engaged with the first set of clutch teeth 44 of the transfer shaft 22 and the first set of clutch teeth 50 of the second output gear 24. In the third position, the inner clutch collar teeth 52 of the clutch 28 are only drivingly engaged with the first set of clutch teeth 44 of the transfer shaft 22. It is understood the clutch 28, the clutch teeth 37, 44, 50, 52, the synchronizers 53, 54, and the engagement portions 38, 49 may be substituted with any clutching device that permits selective engagement of a driving and a driven part.

The first synchronizer 53 is an annular body coupled to the clutch 28 adjacent the engagement portion 38 of the pinion carrier 36. The first synchronizer 53 has a first conical engagement surface 58. Alternately, the first synchronizer 53 may have an engagement surface having any other shape. When the clutch 28 is moved from the third position towards the first position, the first conical engagement surface 58 contacts the engagement portion 38 of the pinion carrier 36, causing the clutch 28 to act upon the pinion carrier 36. When the clutch 28 is moved further towards the first set of clutch teeth 37 of the input shaft 18, the clutch continues to act upon the pinion carrier 36 as the inner clutch collar teeth 52 become drivingly engaged with the first set of clutch teeth 44 of the transfer shaft 22 and the first set of clutch teeth 37 of the pinion carrier 36.

The second synchronizer 54 is an annular body coupled to the clutch 28 adjacent the first end portion 47 of the second output gear 24. The second synchronizer 54 has a second conical engagement surface 59. Alternately, the second synchronizer 54 may have an engagement surface having any other shape. When the clutch 28 is moved from the third position into the second position, the second conical engagement surface 59 contacts the engagement portion 49 of the second output gear 24, causing the clutch 28 to act upon the second output gear 24. When the clutch 28 is moved further towards the first set of clutch teeth 50 of the second output gear 24, the clutch 28 continues to act upon the second output gear 24 as the inner clutch collar teeth 52 become drivingly engaged with the first set of clutch teeth 44 of the transfer shaft 22 and the first set of clutch teeth 50 of the second output gear 24.

The first axle assembly 14 includes the bevel gear pinion 42, a first driving gear 60, a first wheel differential 61, and a first pair of output axle shafts 62. Preferably, the components 42, 60, 61, 62 are formed from a hardened steel, however the components 42, 60, 61, 62 may be formed from any other rigid material. As shown, the first axle assembly 14 includes the four components 42, 60, 61, 62 disposed in a first axle housing 63 but it is understood the first axle assembly 14 may include fewer or more components.

The first driving gear 60 is coupled to a housing of the first wheel differential 61 by a plurality of fasteners or a weld and is rotatable about an axis of the first pair of output axle shafts 62 within the first axle housing 63. Alternately, the first driving gear 60 may be integrally formed with the first wheel differential 61. As is known in the art, the first driving gear 60 has gear teeth formed on an outer surface thereof. The first driving gear 60 may be one of a hypoid gear, a spiral bevel gear, a straight bevel gear, or any other gear known to those skilled in the art. The first driving gear 60 is drivingly engaged with the bevel gear pinion 42 and has a first gear ratio. As a non-limiting example, the first gear ratio may be a 2.26:1 ratio, but it is understood that other ratios may be used. The output shaft 41 is drivingly engaged with the first driving gear 60 of the first axle assembly 14 through a single gear mesh.

The first wheel differential 61 is a bevel gear style differential as is known in the art having a plurality of driving pinions and a pair of side gears drivingly engaged with the first pair of output axle shafts 62. The first wheel differential 61 is rotatably disposed within the first axle housing 63 about the axis of the first pair of output axle shafts 62. Alternately, other styles of differentials may be used in place of the first wheel differential 61.

The first pair of output axle shafts 62 are elongate cylindrical members having a common axis rotatably mounted within the first axle housing 63. Bearings 32 disposed between the first pair of output axle shafts 62 and the first axle housing 63 permit the first pair of output axle shafts 62 to rotate therein. The side gears of the first wheel differential 61 are disposed on first ends of each of the first output axle shafts 62 and wheels (not shown) are disposed on second ends of each of the first output axle shafts 62.

The second axle assembly 16 includes an inter-axle shaft 64, a second driving gear 65, a second wheel differential 66, a second pair of output axle shafts 67, and an axle clutch 68. Preferably, the components 64, 65, 66, 67, 68 are formed from a hardened steel, however the components 64, 65, 66, 67, 68 may be formed from any other rigid material. As shown, the second axle assembly 16 includes the five components 64, 65, 66, 67, 68 disposed in a second axle housing 69 but it is understood the second axle assembly 16 may include fewer or more components.

The inter-axle shaft 64 comprises at least one elongate cylindrical member drivingly engaged with the second output gear 24 through a driven gear 70 coupled to the inter-axle shaft 64. As illustrated, the inter-axle shaft 64 comprises a plurality of elongate cylindrical members connected by joints. Bearings 32 disposed between the inter-axle shaft 64 and the housing 30 permit the inter-axle shaft 64 to rotate therein.

A bevel gear pinion 71 is drivingly coupled to the inter-axle shaft 64 opposite the driven gear 70. As is known in the art, the bevel gear pinion 71 has gear teeth formed on an outer surface thereof. The bevel gear pinion 71 may be one of a hypoid gear, a spiral bevel gear, a straight bevel gear, or any other gear known to those skilled in the art.

The second driving gear 65 is a ring style bevel gear as is known in the art having a set of gear teeth engaged with the gear teeth formed on the bevel gear pinion 71. The second driving gear 65 is coupled to a housing of the second wheel differential 66 by a plurality of fasteners or a weld and is rotatable about an axis of the second pair of output axle shafts 67 within the second axle housing 69. Alternately, the second driving gear 65 may be integrally formed with the second wheel differential 66. The second driving gear 65 is drivingly engaged with the bevel gear pinion 71 and has a second gear ratio. As a non-limiting example, the second gear ratio may be a 4.88:1 ratio, which is a lower gear ratio than the first gear ratio, but it is understood that other ratios or a ratio equal to the first gear ratio may be used.

The second wheel differential 66 is a bevel gear style differential as is known in the art having a plurality of driving pinions and a pair of side gears drivingly engaged with the second pair of output axle shafts 67. The second wheel differential 66 is rotatably disposed within the second axle housing 69 about the axis of the second pair of output axle shafts 67. Alternately, other styles of differentials may be used in place of the second wheel differential 66.

The second pair of output axle shafts 67 are elongate cylindrical members having a common axis rotatably mounted within the second axle housing 69. Bearings 32 disposed between the pair of second output axle shafts 67 and the second axle housing 69 permit the second pair of output axle shafts 67 to rotate therein. The side gears of the second wheel differential 66 are disposed on first ends of each of the second output axle shafts 67 and wheels (not shown) are disposed on second ends of each of the second output axle shafts 67.

The axle clutch 68 is a dog style clutch that divides one of the second output axle shafts 67 into first and second portions. Alternately, the axle clutch 68 may be a component of the second wheel differential 66 which engages a side gear of the second wheel differential 66 and one of the second output axle shafts 67 or any other clutching device as known in the art. The axle clutch 68 may also be a plate style clutch or any other style of clutch. The axle clutch 68 has a plurality of teeth formed thereon for selectively engaging corresponding teeth formed on the first portion and the second portion of the second output axle shafts 67. The axle clutch 68 is urged into an engaged position or a disengaged position by a shift fork 73. A second actuator 74, which is drivingly engaged with the shift fork 73, is engaged to position the shift fork 73, and thus the axle clutch 68, as directed by the controller 55. When the axle clutch 68 is in the engaged position, the first portion of one of the second output axle shafts 67 is drivingly engaged with the second portion of one of the second output axle shafts 67.

The controller 55 is in communication with the power source 11, the first actuator 57, the second actuator 74, and at least one sensor 75. Preferably, the controller 55 is in electrical communication with the power source 11, the first actuator 57, the second actuator 74, and the at least one sensor 75. Alternately, the controller 55 may be in communication with the power source 11, the first actuator 57, the second actuator 74, and the at least one sensor 75 using pneumatics, hydraulics, or a wireless communication medium.

The controller 55 is configured to accept an input containing information regarding at least one of an operating condition of the power source 11, a temperature of the second axle assembly 16, a speed of a portion of the transfer shaft 22, a speed of the second output gear 24, a speed of a portion of the second axle assembly 16, an amount of the rotational force transferred to the power distribution unit 12, a position of the clutch 28, and a position of the axle clutch 68. The controller 55 uses the input to adjust the at least one of the operating condition of the power source 11, the position of the clutch 28, the position of the axle clutch 68, and a duration between successive positions of the clutch 28. The controller 55 performs the adjustment to the operating condition of the power source 11, the position of the clutch 28, the position of the axle clutch 68, and the duration between successive positions of the clutch 28 based on at least one of the operating condition of the power source 11, the temperature of the second axle assembly 16, the speed of the second output gear 24, the speed of a portion of the second axle assembly 16, the amount of the rotational force transferred to the power distribution unit 12, the position of the clutch 28, and the position of the axle clutch 68. The controller 55 references at least one of a series of instructions and conditions, an operator input, at least one data table, and at least one algorithm to determine the adjustment made to the operating condition of the power source 11, the position of the clutch 28, the position of the axle clutch 68, and the duration between successive positions of the clutch 28.

The at least one sensor 75 may be disposed within the housing 30, the first axle housing 63, and the second axle housing 69. Further, it is understood that the at least one sensor 75 may be disposed on an outer surface of one of the housings 30, 63, 69 or mounted elsewhere on the vehicle. The at least one sensor 75 is configured as known in the art to monitor at least one of the operating condition of the power source 11, the temperature of the second axle assembly 16, the speed of a portion of the transfer shaft 22, the speed of the second output gear 24, the speed of a portion of the second axle assembly 16, the amount of a rotational force transferred to the power distribution unit 12, the position of the clutch 28, and the position of the axle clutch 68. The operating condition of the power source 11 may be at least one of an indication that the power source 11 is operating, a rotational speed of the power source 11, a state of a transmission forming a portion of the power source 11, and a speed of the vehicle.

In use, a method for use with the drive axle system 10 facilitates shifting the power distribution unit 12 from a first operating state to a second operating state.

When the power distribution unit 12 is placed in the first operating state, only the first axle assembly 14 is driven in a high speed and low torque manner of operation. The first operating state is employed when the vehicle reaches a "cruising" speed, which typically requires a reduced amount of torque to maintain the "cruising" speed. In the first operating state, the clutch 28 is placed in a first position. In the first position, the inter-axle differential 19 is locked and the first output gear 20 is drivingly engaged with the input shaft 18 through the inter-axle differential 19 in the locked condition. When the inter-axle differential 19 is locked, the pinion carrier 36, the plurality of driving pinions 21, the first output gear 20, and the transfer shaft 22 rotate concurrently because inner clutch collar teeth 52 of the clutch 28 are drivingly engaged with the first set of clutch teeth 37 of the pinion carrier 36 and the first set of clutch teeth 44 of the transfer shaft 22. Further, in the first position, the second output gear 24 is disengaged from the clutch 28 and the transfer shaft 22, and thus the inter-axle differential 19 and the input shaft 18. When the power distribution unit 12 is placed in the first operating state, the axle clutch 68 may be disengaged, permitting the second output gear 24, the driven gear 70, the inter-axle shaft 64, the second driving gear 65, and the second wheel differential 66 to coast to an idle condition.

When the power distribution unit 12 is placed in the second operating state, the first axle assembly 14 and the second axle assembly 16 are simultaneously driven in a low speed and high torque manner of operation. The second operating state is employed when the vehicle is operated at lower speeds or when the vehicle is accelerating. When the vehicle is operated at lower speeds or when the vehicle is accelerating, an increased amount of torque is typically required. In the second operating state, the clutch 28 is placed in a second position. In the second position, the inter-axle differential 19 is unlocked and the output shaft 41 of the first output gear 20 and the second output gear 24 are drivingly engaged with the input shaft 18 through the inter-axle differential 19. The pinion carrier 36 simultaneously drives the first output gear 20 and the transfer shaft 22 through the plurality of driving pinions 21. When the inter-axle differential 19 is unlocked, the pinion carrier 36, the plurality of driving pinions 21, the first output gear 20, and the transfer shaft 22 are free to rotate with respect to one another. Further, in the second position, the first set of clutch teeth 50 of the second output gear 24 and the first set of clutch teeth 44 of the transfer shaft 22 are engaged with the inner clutch collar teeth 52 of the clutch 28. When the power distribution unit 12 is placed in the second operating state, the axle clutch 68 is engaged, permitting the second output gear 24 to drive the second pair of output axle shafts 67 through the driven gear 70, the inter-axle shaft 64, the second driving gear 65, and the second wheel differential 66.

Figure 2:
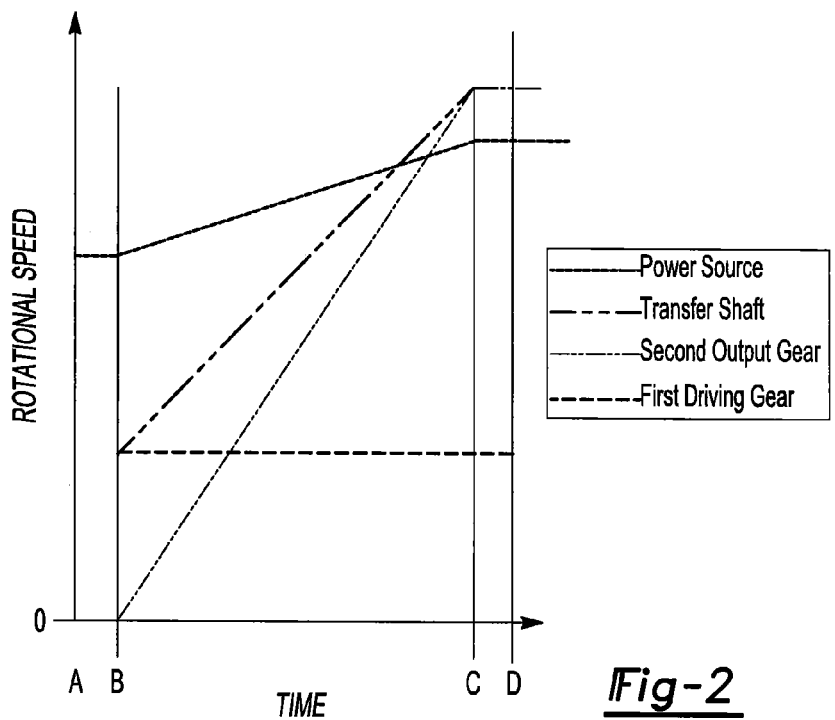
FIG. 2 is a chart illustrating a first example of shifting the power distribution unit from a first operating state to a second operating state.
Figure 3:
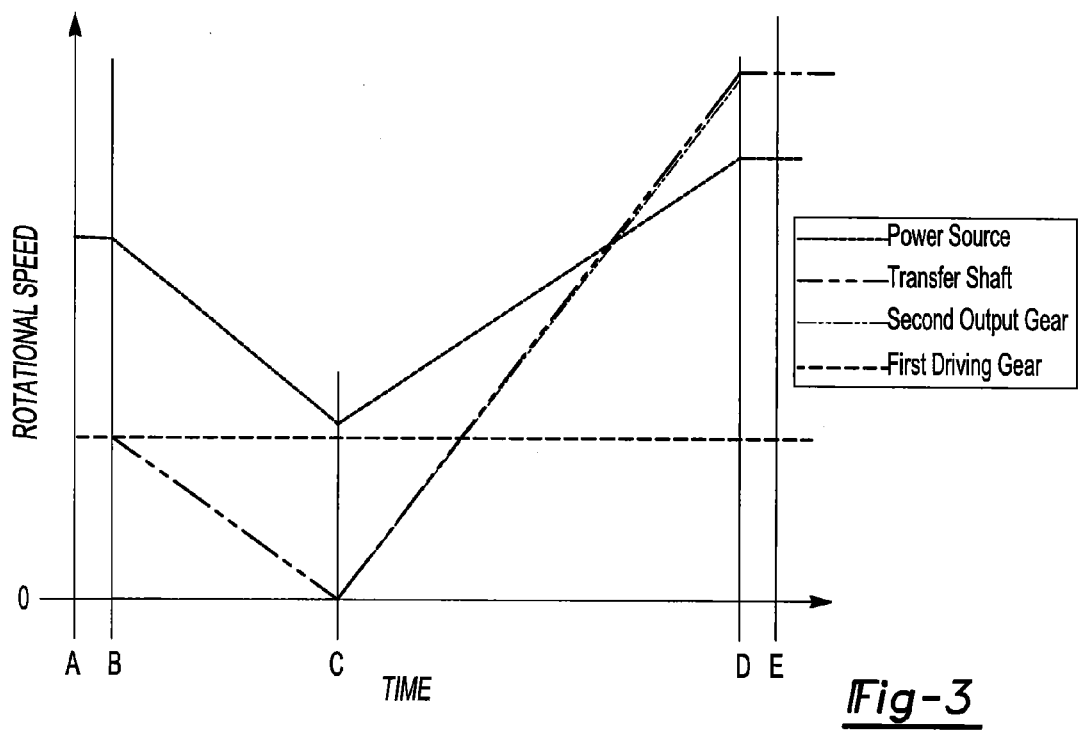
FIG. 3 is a chart illustrating a second example of shifting the power distribution unit from the first operating state to the second operating state.
Figure 4:
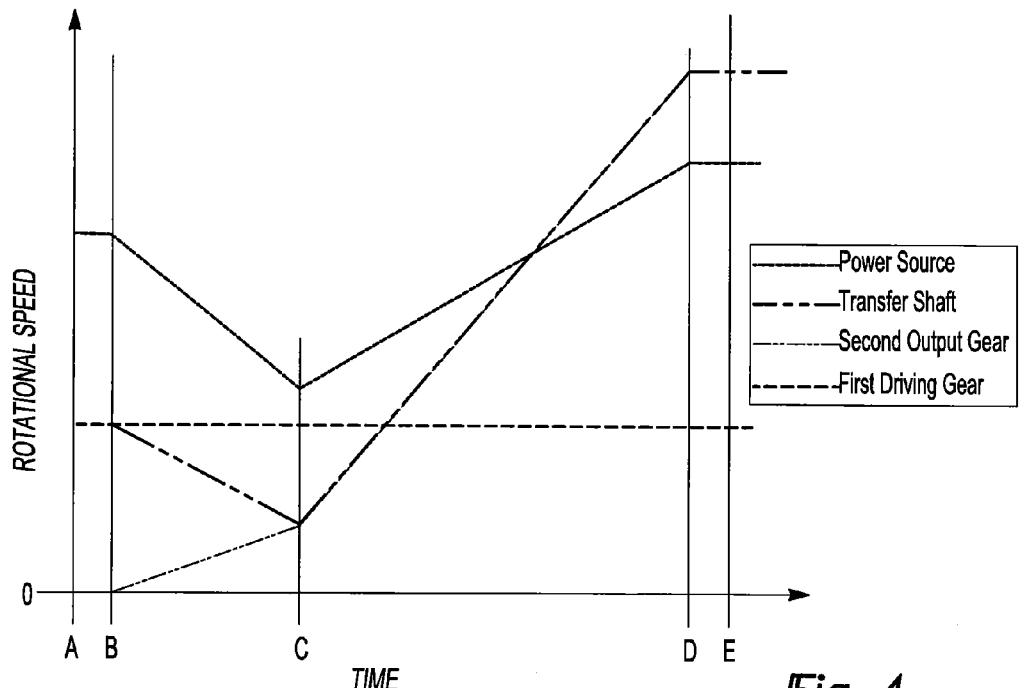
FIG. 4 is a chart illustrating a third example of shifting the power distribution unit from the first operating state to the second operating state.

FIGS. 2-4 are three charts illustrating three non-limiting examples of shifting the power distribution unit 12 from a first operating state to a second operating state.

The shifting procedure as illustrated in FIG. 2 is employed by the controller 55 when the temperature of the second axle assembly 16 is above the predetermined value prior to initiation of the shifting procedure. Further, it is understood that the example illustrated in FIG. 2 may be selected by the controller 55 on the basis that the shifting procedure illustrated in FIG. 2 is advantageous when the temperature of the second axle assembly 16 is within a predetermined temperature range. A horizontal axis shown in FIG. 2 indicates a duration of time from a first chronological reference point, A, to a fourth chronological reference point, D. Chronological reference points B and C respectively occur between points A and D.

A vertical axis shown in FIG. 2 indicates a rotational speed of the first output gear 20, the transfer shaft 22, the second output gear 24, and the power source 11. The vertical axis begins at a rotational speed of zero and increases as the vertical axis extends away from the horizontal axis. A rotational speed of the power source 11 depicted in FIG. 2 is merely for purposes of example, and the shifting procedure is not limited to the depicted speeds.

Point A indicates a starting time of the shifting procedure. At point A, the power distribution unit 12 is in the first operating state. In the first operating state, the clutch 28 is in the first position. When directed by the controller 55 or by an operator of the vehicle, the shifting procedure is initiated by verifying disengagement of the axle clutch 68 and by adjusting the rotational force transferred to the power distribution unit 12.

The step of adjusting the rotational force transferred to the power distribution unit 12 may be performed by one of adjusting an operating condition of the power source 11 and at least partially disengaging a clutch (not shown) forming a portion of the power source 11. When the step of adjusting the rotational force transferred to the power distribution unit 12 is performed by adjusting the operating condition of the power source 11, the operating condition of the power source 11 may be adjusted by one of increasing or decreasing a fuel supplied to the power source 11. When the rotational force is a positive rotational force (meaning the power source 11 is applying a rotational force to the power distribution unit 12) the fuel supplied to the power source 11 is decreased to reduce the rotational force. When the rotational force is a negative rotational force (meaning the power distribution unit 12 is applying a rotational force to the power source 11) the fuel supplied to the power source 11 is increased to increase the rotational force. When the step of one of reducing and interrupting the rotational force transferred to the power distribution unit 12 is performed by at least partially disengaging a clutch or other device (neither are shown) associated with the power source 11, an amount of engagement of the clutch or other device (neither are shown) associated with the power source 11 is decreased to reduce the rotational force. Adjusting the rotational force transferred to the power distribution unit 12 as mentioned hereinabove is performed until the rotational force transferred to the power distribution unit 12 is about equal to an amount of rotational force applied by the power distribution unit 12 to the power source 11.

When the rotational force transferred to the power distribution unit 12 is about equal to an amount of rotational force applied by the power distribution unit 12, the controller 55 engages the first actuator 57 to move the clutch 28 from the first position to the third position. Point B of FIG. 2 indicates a time in the shifting procedure when the clutch 28 is placed in the third position. As mentioned hereinabove, when the clutch 28 is placed in the third position, the inter-axle differential 19 is unlocked and the second output gear 24 is disengaged from the transfer shaft 22, and thus the inter-axle differential 19. Once the clutch 28 is placed in the third position, the controller 55 further engages the first actuator 57 to move the clutch 28 from the third position to the second position while simultaneously adjusting the rotational speed of the power source 11.

As shown in FIG. 2, the duration of time between points B and C represents a duration of time where the clutch 28, which is drivingly engaged with the transfer shaft 22, is acting upon the second output gear 24 but before the inner clutch collar teeth 52 engage the first set of clutch teeth 50 of the second output gear 24. When the clutch 28 acts upon the second output gear 24, a rotational force is applied to the second output gear 24. The rotational force applied to the second output gear 24 causes the second output gear 24, the driven gear 70, the inter-axle shaft 64, the second driving gear 65, and the second wheel differential 66 to adjust the rotational speed from the idle condition to one of a predetermined speed and a target speed.

The predetermined speed is obtained by the controller 55 by referencing information stored in the at least one data table. The target speed is calculated by the controller 55 using the at least one algorithm and a speed of the vehicle. To facilitate adjusting the rotational speed to one of the predetermined speed and the target speed, the rotational speed of the power source 11 is adjusted. As a non-limiting example, the rotational speed of the power source 11 may be adjusted by one of increasing or decreasing a fuel supplied to the power source 11. A shown in FIG. 2, the rotational speed of the power source 11 is increased between points B and C. A near constant rotational speed of the first pair of output axle shafts 62 (as the vehicle coasts during the shifting procedure) backdrives the first output gear 20. The first output gear 20, backdriven at the near constant rotational speed, permits increases in the rotational speed of the power source 11 to be directly reflected in the rotational speed of the transfer shaft 22 through the inter-axle differential 19. The concurrent rotation of the pinion carrier 36 (as driven by the input shaft 18) and the first output gear 20 drives the transfer shaft 22 through the plurality of driving pinions 21 to adjust the rotational speed of the second output gear 24, the driven gear 70, the inter-axle shaft 64, the second driving gear 65, and the second wheel differential 66 through the clutch 28.

A shown in FIG. 2, the one of the predetermined speed and the target speed are obtained when the rotational speed of the transfer shaft 22 and the second output gear 24 are about equal. Further, the one of the predetermined speed and the target speed permits a meshing engagement between the second output gear 24 and the transfer shaft 22 with the clutch 28.

When the one of the predetermined speed and the target speed are obtained, the controller 55 further engages the first actuator 57 to move the clutch 28 from the third position to the second position. Point C of FIG. 2 indicates a time in the shifting procedure when the clutch 28 is placed in the second position. As mentioned hereinabove, when the clutch 28 is placed in the second position, the inter-axle differential 19 is unlocked and the second output gear 24 is engaged with the transfer shaft 22, and thus the inter-axle differential 19.

When the one of the predetermined speed and the target speed are obtained, the controller 55 commands the second actuator 74 to move the axle clutch 68 to an engaged position. Point C of FIG. 2 indicates the time of the shifting procedure when the controller 55 commands the second actuator 74 to move the axle clutch 68 to an engaged position. Point D of FIG. 2 indicates the time of the shifting procedure when the axle clutch 68 is engaged. As shown in FIG. 2, the duration of time between points C and D represents a duration of time after the controller 55 commands the second actuator 74 to engage the axle clutch 68 but before the axle clutch 68 is engaged. The axle clutch 68 may not immediately engage due to a misalignment between the first portion and the second portion of one of the second pair of output axle shafts, a slipping condition of one of the wheels (not shown) coupled to the second pair of output axle shafts 67, or due to both conditions. As shown in FIG. 2, once the one of the predetermined speed and the target speed are obtained, a substantially constant rotational speed of the power source 11 is maintained by the controller 55. When the axle clutch 68 is engaged, the second pair of output axle shafts 67 is drivingly engaged with the second output gear 24 through the driven gear 70, the inter-axle shaft 64, the second driving gear 65, and the second wheel differential 66.

Following point D, the step of one of increasing and resuming the rotational force transferred to the power distribution unit 12 may be performed by one of adjusting an operating condition of the power source 11 and by engaging the clutch (not shown) forming a portion of the power source 11. When the step of increasing the rotational force transferred to the power distribution unit 12 is performed by adjusting the operating condition of the power source 11, the operating condition of the power source 11 may be adjusted by increasing the fuel supplied to the power source 11. When the step of increasing and resuming the rotational force transferred to the power distribution unit 12 is performed by engaging the clutch (not shown), the amount of engagement of the clutch (not shown) associated with the power source 11 is increased to increase the rotational force. Adjusting the rotational force transferred to the power distribution unit 12 as mentioned hereinabove completes the shifting procedure as illustrated in FIG. 2, and the controller 55 returns control of one of the operating conditions of the power source 11 and the clutch (not shown) to the operator.

Once the drive axle system 10 is placed in the second operating state, the rotational force applied to the power distribution unit 12 by the power source 11 is distributed between the first output gear 20 and the second output gear 24 through the inter-axle differential 19. A rotational difference of the first output gear 20 and the second output gear 24 caused by a difference between the first gear ratio and the second gear ratio is accommodated by the inter-axle differential 19. Because the inter-axle differential 19 accommodates the rotational difference between the first gear ratio and the second gear ratio, a cumulative gear ratio is provided. The cumulative gear ratio is intermediate the first gear ratio and the second gear ratio.

The shifting procedure as illustrated in FIG. 3 is employed by the controller 55 when the temperature of the second axle assembly 16 is below the predetermined value prior to initiation of the shifting procedure. Further, it is understood that the example illustrated in FIG. 3 may be selected by the controller 55 on the basis that the shifting procedure illustrated in FIG. 3 is advantageous when the temperature of the second axle assembly 16 is within a predetermined temperature range. The shifting procedure illustrated in FIG. 3 may be selected when the temperature of the second axle assembly 16 is low enough to substantially reduce an effectiveness of the synchronizer 54 of the clutch 28 in acting upon the second output gear 24 due to an increase in viscosity of the lubricant disposed in the second axle assembly 16. A horizontal axis shown in FIG. 3 indicates a duration of time from a first chronological reference point, A, to a fifth chronological reference point, E. Chronological reference points B, C, and D respectively occur between points A and E.

A vertical axis shown in FIG. 3 indicates the rotational speed of the first output gear 20, the transfer shaft 22, the second output gear 24, and the power source 11. The vertical axis begins at a rotational speed of zero and increases as the vertical axis extends away from the horizontal axis. The rotational speed of the power source 11 depicted in FIG. 3 is merely for purposes of example, and the shifting procedure is not limited to the depicted speeds.

Point A indicates a starting time of the shifting procedure. At point A, the power distribution unit 12 is in the first operating state. In the first operating state, the clutch 28 is in the first position. When directed by the controller 55 or by an operator of the vehicle, the shifting procedure is initiated by verifying disengagement of the axle clutch 68 and by adjusting the rotational force transferred to the power distribution unit 12.

The step of adjusting the rotational force transferred to the power distribution unit 12 may be performed by one of adjusting an operating condition of the power source 11 and at least partially disengaging a clutch (not shown) forming a portion of the power source 11. When the step of adjusting the rotational force transferred to the power distribution unit 12 is performed by adjusting the operating condition of the power source 11, the operating condition of the power source 11 may be adjusted by one of increasing or decreasing a fuel supplied to the power source 11. When the rotational force is a positive rotational force (meaning the power source 11 is applying a rotational force to the power distribution unit 12) the fuel supplied to the power source 11 is decreased to reduce the rotational force. When the rotational force is a negative rotational force (meaning the power distribution unit 12 is applying a rotational force to the power source 11) the fuel supplied to the power source 11 is increased to increase the rotational force. When the step of one of reducing and interrupting the rotational force transferred to the power distribution unit 12 is performed by at least partially disengaging a clutch or other device (neither are shown) associated with the power source 11, an amount of engagement of the clutch or other device (neither are shown) associated with the power source 11 is decreased to reduce the rotational force. Adjusting the rotational force transferred to the power distribution unit 12 as mentioned hereinabove is performed until the rotational force transferred to the power distribution unit 12 is about equal to an amount of rotational force applied by the power distribution unit 12 to the power source 11.

When the rotational force transferred to the power distribution unit 12 is about equal to an amount of rotational force applied by the power distribution unit 12, the controller 55 engages the first actuator 57 to move the clutch 28 from the first position to the third position. Point B of FIG. 3 indicates a time in the shifting procedure when the clutch 28 is placed in the third position. As mentioned hereinabove, when the clutch 28 is placed in the third position, the inter-axle differential 19 is unlocked and the second output gear 24 is disengaged from the transfer shaft 22, and thus the inter-axle differential 19.

Once the clutch 28 is placed in the third position, the controller 55 decreases a rotational speed of the power source 11. As a non-limiting example, the rotational speed of the power source 11 may be decreased by decreasing a fuel supplied to the power source 11. A shown in FIG. 3, the rotational speed of the power source 11 is decreased between points B and C. A near constant rotational speed of the first pair of output axle shafts 62 (as the vehicle coasts during the shifting procedure) backdrives the first output gear 20. The first output gear 20, backdriven at the near constant rotational speed, permits decreases in the rotational speed of the power source 11 to be directly reflected in the rotational speed of the transfer shaft 22 through the inter-axle differential 19. The concurrent rotation of the pinion carrier 36 (as driven by the input shaft 18) and the first output gear 20 retards the transfer shaft 22 through the plurality of driving pinions 21 to adjust the rotational speed of the transfer shaft 22. The rotational speed of the transfer shaft 22 is adjusted to facilitate a smooth engagement of the clutch 28 with the second output gear 24 when the clutch 28 is moved from the third position to the second position. As a non-limiting example, the rotational speed of the power source 11 may be decreased between points B and C to decrease the rotational speed of the transfer shaft 22 to about zero. Point C of FIG. 3 indicates a time in the shifting procedure when the clutch 28 is placed in the second position.

When the rotational speed of the transfer shaft 22 is adjusted to facilitate a smooth engagement of the clutch 28 with the second output gear 24, the controller 55 further engages the first actuator 57 to move the clutch 28 from the third position to the second position while simultaneously adjusting a rotational speed of the power source 11.

As shown in FIG. 3, the duration of time between points C and D represents a duration of time where the inner clutch collar teeth 52 are drivingly engaged with the clutch teeth 44 of the transfer shaft 22 and the clutch teeth 50 of the second output gear 24 but before the controller 55 commands the second actuator 74 to move the axle clutch 68 to an engaged position.

When the clutch 28 is engaged with the second output gear 24, the second output gear 24 is drivingly engaged with the transfer shaft 22. When the second output gear 24 is drivingly engaged with the transfer shaft 22, the rotational speed of the second output gear 24, the driven gear 70, the inter-axle shaft 64, the second driving gear 65, and the second wheel differential 66 may be adjusted to one of a predetermined speed and a target speed.

Further, when the second output gear 24 is drivingly engaged with the transfer shaft 22, the second driving gear 65 and the second wheel differential 66 imparts energy to the lubricant disposed within the second axle assembly 16. The duration of time between points C and D may be determined by the controller based on the temperature of the second axle assembly 16 as indicated by the sensor 75. The controller 55 may increase or decrease the duration of time between points C and D until the temperature of the second axle assembly 16 is above the predetermined value. As a non-limiting example, the predetermined value may be about 20° Fahrenheit.

The predetermined speed is obtained by the controller 55 by referencing information stored in the at least one data table. The target speed is calculated by the controller 55 using the at least one algorithm and a speed of the vehicle. To facilitate adjusting the rotational speed to one of the predetermined speed and the target speed, the rotational speed of the power source 11 is adjusted. As a non-limiting example, the rotational speed of the power source 11 may be adjusted by one of increasing or decreasing a fuel supplied to the power source 11. A shown in FIG. 3, the rotational speed of the power source 11 is increased between points C and D. A near constant rotational speed of the first pair of output axle shafts 62 (as the vehicle coasts during the shifting procedure) backdrives the first output gear 20. The first output gear 20, backdriven at the near constant rotational speed, permits increases in the rotational speed of the power source 11 to be directly reflected in the rotational speed of the transfer shaft 22 through the inter-axle differential 19. The concurrent rotation of the pinion carrier 36 (as driven by the input shaft 18) and the first output gear 20 drives the transfer shaft 22 through the plurality of driving pinions 21 to adjust the rotational speed of the second output gear 24, the driven gear 70, the inter-axle shaft 64, the second driving gear 65, and the second wheel differential 66 through the clutch 28 placed in the second position.

A shown in FIG. 3, the one of the predetermined speed and the target speed are obtained when the rotational speed of the second output gear 24, the driven gear 70, the inter-axle shaft 64, the second driving gear 65, and the second wheel differential 66 permits a meshing engagement between the first portion of one of the second pair of output axle shafts 67 and the second portion of one the second pair of output axle shafts 67 with the axle clutch 68.

When the one of the predetermined speed and the target speed are obtained, the controller 55 commands the second actuator 74 to move the axle clutch 68 to the engaged position. Point D of FIG. 3 indicates the time of the shifting procedure when the controller 55 commands the second actuator 74 to move the axle clutch 68 to the engaged position. Point E of FIG. 3 indicates the time of the shifting procedure when the axle clutch 68 is engaged. As shown in FIG. 3, the duration of time between points D and E represents a duration of time after the controller 55 commands the second actuator 74 to engage the axle clutch 68 but before the axle clutch 68 is engaged. The axle clutch 68 may not immediately engage due to a misalignment between the first portion and the second portion of one of the second pair of output axle shafts, a slipping condition of one of the wheels (not shown) coupled to the second pair of output axle shafts 67, or due to both conditions. As shown in FIG. 3, once the one of the predetermined speed and the target speed are obtained, a substantially constant rotational speed of the power source 11 is maintained by the controller 55. When the axle clutch 68 is engaged, the second pair of output axle shafts 67 is drivingly engaged with the second output gear 24 through the driven gear 70, the inter-axle shaft 64, the second driving gear 65, and the second wheel differential 66.

Following point E, the step of one of increasing and resuming the rotational force transferred to the power distribution unit 12 may be performed by one of adjusting an operating condition of the power source 11 and by engaging the clutch (not shown) forming a portion of the power source 11. When the step of increasing the rotational force transferred to the power distribution unit 12 is performed by adjusting the operating condition of the power source 11, the operating condition of the power source 11 may be adjusted by increasing the fuel supplied to the power source 11. When the step of increasing and resuming the rotational force transferred to the power distribution unit 12 is performed by engaging the clutch (not shown), the amount of engagement of the clutch (not shown) associated with the power source 11 is increased to increase the rotational force. Adjusting the rotational force transferred to the power distribution unit 12 as mentioned hereinabove completes the shifting procedure as illustrated in FIG. 3, and the controller 55 returns control of one of the operating conditions of the power source 11 and the clutch (not shown) to the operator.

Once the drive axle system 10 is placed in the second operating state, the rotational force applied to the power distribution unit 12 by the power source 11 is distributed between the first output gear 20 and the second output gear 24 through the inter-axle differential 19. A rotational difference of the first output gear 20 and the second output gear 24 caused by a difference between the first gear ratio and the second gear ratio is accommodated by the inter-axle differential 19. Because the inter-axle differential 19 accommodates the rotational difference between the first gear ratio and the second gear ratio, a cumulative gear ratio is provided. The cumulative gear ratio is intermediate the first gear ratio and the second gear ratio.

The shifting procedure as illustrated in FIG. 4 is employed by the controller 55 when the temperature of the second axle assembly 16 is below the predetermined value prior to initiation of the shifting procedure. Further, it is understood that the example illustrated in FIG. 4 may be selected by the controller 55 on the basis that the shifting procedure illustrated in FIG. 4 is advantageous when the temperature of the second axle assembly 16 is within a predetermined temperature range. The shifting procedure illustrated in FIG. 3 may be selected when the temperature of the second axle assembly 16 is low enough to reduce an effectiveness of the synchronizer 54 of the clutch 28 in acting upon the second output gear 24 due to an increase in viscosity of the lubricant disposed in the second axle assembly 16. A horizontal axis shown in FIG. 4 indicates a duration of time from a first chronological reference point, A, to a fifth chronological reference point, E. Chronological reference points B, C, and D respectively occur between points A and E.

A vertical axis shown in FIG. 4 indicates a rotational speed of the first output gear 20, the transfer shaft 22, the second output gear 24, and the power source 11. The vertical axis begins at a rotational speed of zero and increases as the vertical axis extends away from the horizontal axis. The rotational speed of the power source 11 depicted in FIG. 4 is merely for purposes of example, and the shifting procedure is not limited to the depicted speeds.

Point A indicates a starting time of the shifting procedure. At point A, the power distribution unit 12 is in the first operating state. In the first operating state, the clutch 28 is in the first position. When directed by the controller 55 or by an operator of the vehicle, the shifting procedure is initiated by verifying disengagement of the axle clutch 68 and by adjusting the rotational force transferred to the power distribution unit 12.

The step of adjusting the rotational force transferred to the power distribution unit 12 may be performed by one of adjusting an operating condition of the power source 11 and at least partially disengaging a clutch (not shown) forming a portion of the power source 11. When the step of adjusting the rotational force transferred to the power distribution unit 12 is performed by adjusting the operating condition of the power source 11, the operating condition of the power source 11 may be adjusted by one of increasing or decreasing a fuel supplied to the power source 11. When the rotational force is a positive rotational force (meaning the power source 11 is applying a rotational force to the power distribution unit 12) the fuel supplied to the power source 11 is decreased to reduce the rotational force. When the rotational force is a negative rotational force (meaning the power distribution unit 12 is applying a rotational force to the power source 11) the fuel supplied to the power source 11 is increased to increase the rotational force. When the step of one of reducing and interrupting the rotational force transferred to the power distribution unit 12 is performed by at least partially disengaging a clutch or other device (neither are shown) associated with the power source 11, an amount of engagement of the clutch or other device (neither are shown) associated with the power source 11 is decreased to reduce the rotational force. Adjusting the rotational force transferred to the power distribution unit 12 as mentioned hereinabove is performed until the rotational force transferred to the power distribution unit 12 is about equal to an amount of rotational force applied by the power distribution unit 12 to the power source 11.

When the rotational force transferred to the power distribution unit 12 is about equal to an amount of rotational force applied by the power distribution unit 12, the controller 55 engages the first actuator 57 to move the clutch 28 from the first position to the third position. Point B of FIG. 4 indicates a time in the shifting procedure when the clutch 28 is placed in the third position. As mentioned hereinabove, when the clutch 28 is placed in the third position, the inter-axle differential 19 is unlocked and the second output gear 24 is disengaged from the transfer shaft 22, and thus the inter-axle differential 19.

Once the clutch 28 is placed in the third position, the controller 55 further engages the first actuator 57 to move the clutch 28 from the third position to the second position while simultaneously adjusting a rotational speed of the power source 11. As shown in FIG. 4, the rotational speed of the power source 11 is decreased between points B and C as the second synchronizer 54 of the clutch 28 acts upon the second output gear 24 but before the clutch 28 is placed in the second position.

As a non-limiting example, the rotational speed of the power source 11 may be decreased by decreasing a fuel supplied to the power source 11. A shown in FIG. 4, the rotational speed of the power source 11 is decreased between points B and C. A near constant rotational speed of the first pair of output axle shafts 62 (as the vehicle coasts during the shifting procedure) backdrives the first output gear 20. The first output gear 20, backdriven at the near constant rotational speed, permits decreases in the rotational speed of the power source 11 to be directly reflected in the rotational speed of the transfer shaft 22 through the inter-axle differential 19. The concurrent rotation of the pinion carrier 36 (as driven by the input shaft 18) and the first output gear 20 retards the transfer shaft 22 through the plurality of driving pinions 21 to adjust the rotational speed of the transfer shaft 22. The rotational speed of the transfer shaft 22 is adjusted to facilitate a smooth engagement of the clutch 28 with the second output gear 24 when the clutch 28 is moved from the third position to the second position. Point C indicates a time in the shifting procedure when the clutch 28 is placed in the second position.

When one of the rotational speed of the power source 11 and the rotational speed of the transfer shaft 22 are adjusted to facilitate a smooth engagement of the clutch 28 with the second output gear 24, the controller 55 further engages the first actuator 57 to engage the clutch 28 with the second output gear 24 then increasing a rotational speed of the power source 11. Between points C and D, when the clutch 28 is placed in the second position, the rotational speed of the power source 11 is increased.

As shown in FIG. 4, the duration of time between points C and D represents a duration of time where the inner clutch collar teeth 52 are drivingly engaged with the clutch teeth 44 of the transfer shaft 22 and the clutch teeth 50 of the second output gear 24 but before the controller commands the second actuator 74 to move the axle clutch 68 to an engaged position.

When the clutch 28 is engaged with the second output gear 24, the second output gear 24 is drivingly engaged with the transfer shaft 22. When the second output gear 24 is drivingly engaged with the transfer shaft 22, the rotational speed of the second output gear 24, the driven gear 70, the inter-axle shaft 64, the second driving gear 65, and the second wheel differential 66 may be adjusted to one of a predetermined speed and a target speed.

Further, when the second output gear 24 is drivingly engaged with the transfer shaft 22, the second driving gear 65 and the second wheel differential 66 imparts energy to the lubricant disposed within the second axle assembly 16. The duration of time between points C and D may be determined by the controller based on the temperature of the second axle assembly 16 as indicated by the sensor 75. The controller 55 may increase or decrease the duration of time between points C and D until the temperature of the second axle assembly 16 is above the predetermined value. As a non-limiting example, the predetermined value may be about 20° Fahrenheit.

The predetermined speed is obtained by the controller 55 by referencing information stored in the at least one data table. The target speed is calculated by the controller 55 using the at least one algorithm and a speed of the vehicle. To facilitate adjusting the rotational speed to one of the predetermined speed and the target speed, the rotational speed of the power source 11 is adjusted. The rotational speed of the power source 11 is adjusted by adjusting the rotational speed of the power source 11. As a non-limiting example, the rotational speed of the power source 11 may be adjusted by increasing a fuel supplied to the power source 11. A shown in FIG. 4, the rotational speed of the power source 11 is increased between points C and D. A near constant rotational speed of the first pair of output axle shafts 62 (as the vehicle coasts during the shifting procedure) backdrives the first output gear 20. The first output gear 20, backdriven at the near constant rotational speed, permits increases in the rotational speed of the power source 11 to be directly reflected in the rotational speed of the transfer shaft 22 through the inter-axle differential 19. The concurrent rotation of the pinion carrier 36 (as driven by the input shaft 18) and the first output gear 20 drives the transfer shaft 22 through the plurality of driving pinions 21 to adjust the rotational speed of the second output gear 24, the driven gear 70, the inter-axle shaft 64, the second driving gear 65, and the second wheel differential 66 through the clutch 28 placed in the second position.

A shown in FIG. 4, the one of the predetermined speed and the target speed are obtained when the rotational speed of the second output gear 24, the driven gear 70, the inter-axle shaft 64, the second driving gear 65, and the second wheel differential 66 permits a meshing engagement between the first portion of one of the second pair of output axle shafts 67 and the second portion of one the second pair of output axle shafts 67 with the axle clutch 68.

When the one of the predetermined speed and the target speed are obtained, the controller 55 commands the second actuator 74 to move the axle clutch 68 to the engaged position. Point D of FIG. 4 indicates the time in the shifting procedure when the controller 55 commands the second actuator 74 to move the axle clutch 68 to the engaged position. Point E of FIG. 4 indicates the time of the shifting procedure when the axle clutch 68 is engaged. As shown in FIG. 4, the duration of time between points D and E represents a duration of time after the controller 55 commands the second actuator 74 to engage the axle clutch 68 but before the axle clutch 68 is engaged. The axle clutch 68 may not immediately engage due to a misalignment between the first portion and the second portion of one of the second pair of output axle shafts, a slipping condition of one of the wheels (not shown) coupled to the second pair of output axle shafts 67, or due to both conditions. As shown in FIG. 4, once the one of the predetermined speed and the target speed are obtained, a substantially constant rotational speed of the power source 11 is maintained by the controller 55. When the axle clutch 68 is engaged, the second pair of output axle shafts 67 is drivingly engaged with the second output gear 24 through the driven gear 70, the inter-axle shaft 64, the second driving gear 65, and the second wheel differential 66.

Following point E, the step of one of increasing and resuming the rotational force transferred to the power distribution unit 12 may be performed by one of adjusting an operating condition of the power source 11 and by engaging the clutch (not shown) forming a portion of the power source 11. When the step of increasing the rotational force transferred to the power distribution unit 12 is performed by adjusting the operating condition of the power source 11, the operating condition of the power source 11 may be adjusted by increasing the fuel supplied to the power source 11. When the step of increasing and resuming the rotational force transferred to the power distribution unit 12 is performed by engaging the clutch (not shown), the amount of engagement of the clutch (not shown) associated with the power source 11 is increased to increase the rotational force. Adjusting the rotational force transferred to the power distribution unit 12 as mentioned hereinabove completes the shifting procedure as illustrated in FIG. 4, and the controller 55 returns control of one of the operating conditions of the power source 11 and the clutch (not shown) to the operator.

Once the drive axle system 10 is placed in the second operating state, the rotational force applied to the power distribution unit 12 by the power source 11 is distributed between the first output gear 20 and the second output gear 24 through the inter-axle differential 19. A rotational difference of the first output gear 20 and the second output gear 24 caused by a difference between the first gear ratio and the second gear ratio is accommodated by the inter-axle differential 19. Because the inter-axle differential 19 accommodates the rotational difference between the first gear ratio and the second gear ratio, a cumulative gear ratio is provided. The cumulative gear ratio is intermediate the first gear ratio and the second gear ratio.

Figure 5:
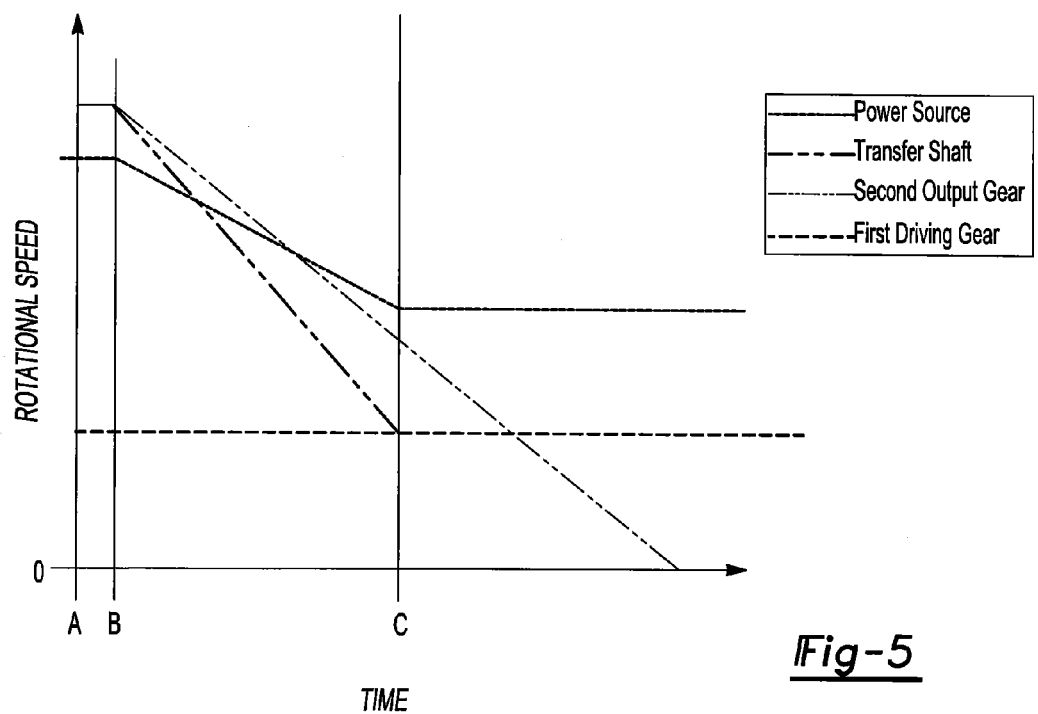
FIG. 5 is a chart illustrating a first example of shifting the power distribution unit from the second operating state to the first operating state.

FIG. 5 is a chart illustrating an example of shifting the power distribution unit 12 from a second operating state to a first operating state. FIG. 5 illustrates a non-limiting example of shifting the power distribution unit 12 from the second operating state to the first operating state.

A horizontal axis shown in FIG. 5 indicates a duration of time from a first chronological reference point, A, to a third chronological reference point, C. Chronological reference point B occurs between points A and C.

A vertical axis shown in FIG. 5 indicates a rotational speed of the first output gear 20, the transfer shaft 22, the second output gear 24, and the power source 11. The vertical axis begins at a rotational speed of zero and increases as the vertical axis extends away from the horizontal axis. The rotational speed of the power source 11 depicted in FIG. 5 is merely for purposes of example, and the shifting procedure is not limited to the depicted speeds.

Point A indicates a starting time of the shifting procedure. At point A, the power distribution unit 12 is in the second operating state. In the second operating state, the clutch 28 is in the second position. When directed by the controller 55 or by an operator of the vehicle, the shifting procedure is initiated by disengaging the axle clutch 68 and by adjusting the rotational force transferred to the power distribution unit 12.

Point A of FIG. 5 indicates the time of the shifting procedure when the controller 55 commands the second actuator 74 to move the axle clutch 68 to a disengaged position. Point B of FIG. 5 indicates the time of the shifting procedure when the axle clutch 68 is disengaged. As shown in FIG. 5, the duration of time between points A and B represents a duration of time after the controller 55 commands the second actuator 74 to disengage the axle clutch 68 but before the axle clutch 68 is disengaged. The axle clutch 68 may not immediately disengage due to a slipping condition of one of the wheels (not shown) coupled to the second pair of output axle shafts 67. As shown in FIG. 5, to facilitate disengagement of the axle clutch 68, a substantially constant rotational speed of the power source 11 is maintained by the controller 55. When the axle clutch 68 is disengaged, the second pair of output axle shafts 67 is drivingly disengaged from the second output gear 24.

The step of adjusting the rotational force transferred to the power distribution unit 12 may be performed by one of adjusting an operating condition of the power source 11 and at least partially disengaging a clutch (not shown) forming a portion of the power source 11. When the step of adjusting the rotational force transferred to the power distribution unit 12 is performed by adjusting the operating condition of the power source 11, the operating condition of the power source 11 may be adjusted by one of increasing or decreasing a fuel supplied to the power source 11. When the rotational force is a positive rotational force (meaning the power source 11 is applying a rotational force to the power distribution unit 12) the fuel supplied to the power source 11 is decreased to reduce the rotational force. When the rotational force is a negative rotational force (meaning the power distribution unit 12 is applying a rotational force to the power source 11) the fuel supplied to the power source 11 is increased to increase the rotational force. When the step of one of reducing and interrupting the rotational force transferred to the power distribution unit 12 is performed by at least partially disengaging a clutch or other device (neither are shown) associated with the power source 11, an amount of engagement of the clutch or other device (neither are shown) associated with the power source 11 is decreased to reduce the rotational force. Adjusting the rotational force transferred to the power distribution unit 12 as mentioned hereinabove is performed until the rotational force transferred to the power distribution unit 12 is about equal to an amount of rotational force applied by the power distribution unit 12 to the power source 11.

When the rotational force transferred to the power distribution unit 12 is about equal to an amount of rotational force applied by the power distribution unit 12, the controller 55 engages the first actuator 57 to move the clutch 28 from the second position to the third position. Point B of FIG. 5 indicates a time in the shifting procedure when the clutch 28 is placed in the third position. As mentioned hereinabove, when the clutch 28 is placed in the third position, the inter-axle differential 19 is unlocked and the second output gear 24 is disengaged from the transfer shaft 22, and thus the inter-axle differential 19. As shown in FIG. 5, between points B and C, when the clutch 28 is moved to the third position and the axle clutch 68 is disengaged, the second output gear 24, the driven gear 70, the inter-axle shaft 64, the bevel gear pinion 72, the second driving gear 65, and the second wheel differential 66 coast to the idle condition.

Once the clutch 28 is placed in the third position, the controller 55 further engages the first actuator 57 to move the clutch 28 from the third position to the first position while simultaneously adjusting a rotational speed of the power source 11. As shown in FIG. 5, the rotational speed of the power source 11 is decreased as the first synchronizer 53 of the clutch 28 acts upon the pinion carrier 36 but before the clutch 28 is placed in the first position.

As a non-limiting example, the rotational speed of the power source 11 may be decreased by decreasing a fuel supplied to the power source 11. A shown in FIG. 5, the rotational speed of the power source 11 is decreased between points B and C. A near constant rotational speed of the first pair of output axle shafts 62 (as the vehicle coasts during the shifting procedure) backdrives the first output gear 20. The first output gear 20, backdriven at the near constant rotational speed, permits decreases in the rotational speed of the power source 11 to be directly reflected in the rotational speed of the transfer shaft 22 through the inter-axle differential 19. The concurrent rotation of the pinion carrier 36 (as driven by the input shaft 18) and the first output gear 20 retards the transfer shaft 22 through the plurality of driving pinions 21 to adjust the rotational speed of the transfer shaft 22. The rotational speed of the transfer shaft 22 is adjusted to facilitate a smooth engagement of the clutch 28 with the first output gear 20 when the clutch 28 is moved from the third position to the first position.

When one of the rotational speed of the power source 11 and the rotational speed of the transfer shaft 22 are adjusted to facilitate a smooth engagement of the clutch 28 with the first output gear 20, the controller 55 further engages the first actuator 57 to move the clutch 28 from the third position to the first position. Point C of FIG. 5 indicates a time in the shifting procedure when the clutch 28 is placed in the first position. As mentioned hereinabove, when the clutch 28 is placed in the first position, the inter-axle differential 19 is locked and the first output gear 20 is engaged with the input shaft 18 through the inter-axle differential 19 in the locked condition.

Following point C, the step of one of increasing and resuming the rotational force transferred to the power distribution unit 12 may be performed by one of adjusting an operating condition of the power source 11 and by engaging the clutch (not shown) forming a portion of the power source 11. When the step of increasing the rotational force transferred to the power distribution unit 12 is performed by adjusting the operating condition of the power source 11, the operating condition of the power source 11 may be adjusted by increasing the fuel supplied to the power source 11. When the step of increasing and resuming the rotational force transferred to the power distribution unit 12 is performed by engaging the clutch (not shown), the amount of engagement of the clutch (not shown) associated with the power source 11 is increased to increase the rotational force. Adjusting the rotational force transferred to the power distribution unit 12 as mentioned hereinabove completes the shifting procedure as illustrated in FIG. 5, and the controller 55 returns control of one of the operating conditions of the power source 11 and the clutch (not shown) to the operator.

Figure 6:
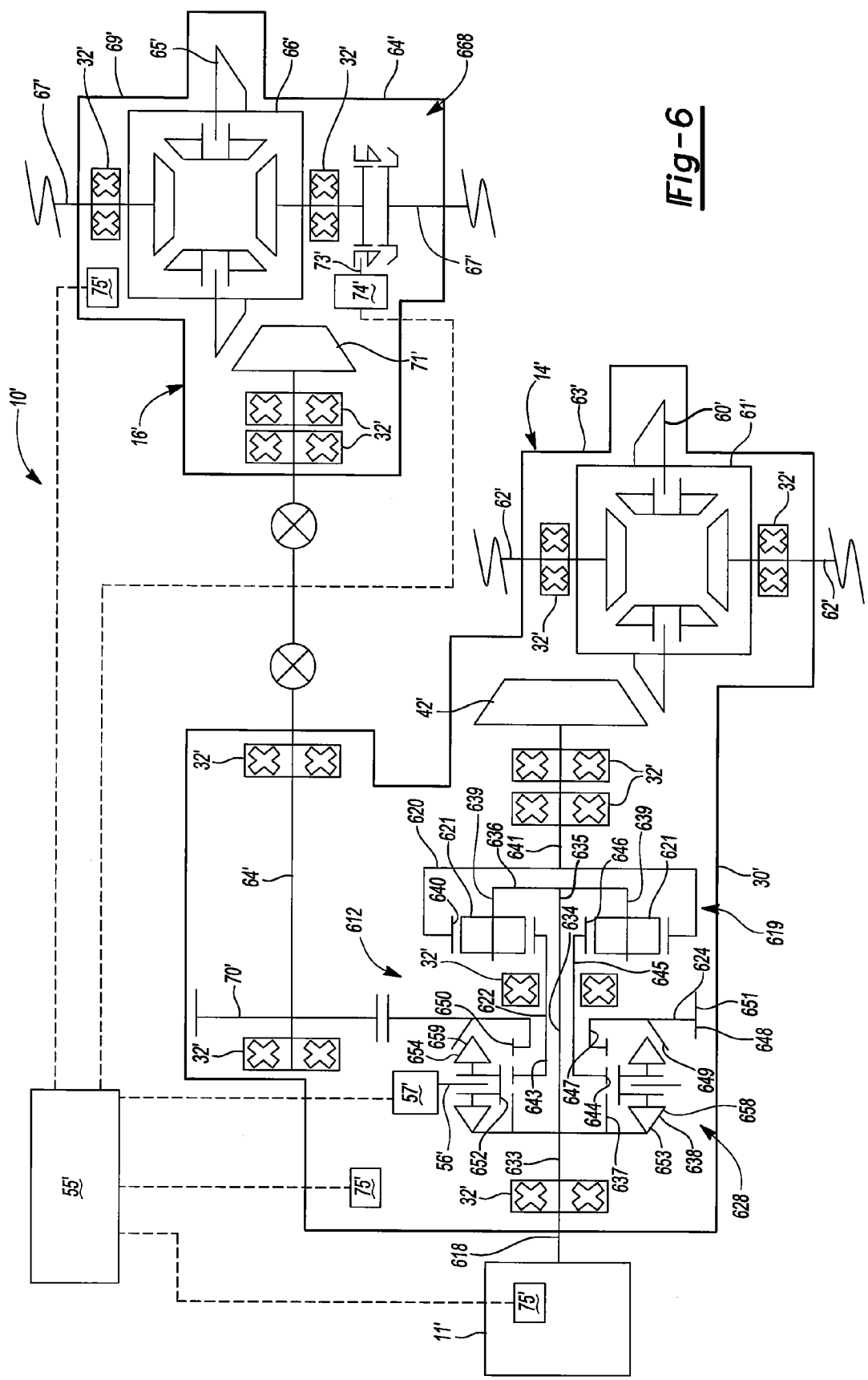
FIG. 6 is a schematic view of a tandem drive axle system including a power distribution unit according to another embodiment of the present invention.

FIG. 6 depicts yet another embodiment of the present invention. The embodiment shown in FIG. 6 is similar to the embodiment shown in FIG. 1. Similar features of the embodiment shown in FIG. 6 are numbered similarly in series, with the exception of the features described below.

FIG. 6 illustrates a drive axle system 10' for a vehicle having a power source 11'. The drive axle system 10' preferably includes a power distribution unit 612, a first axle assembly 14', and a second axle assembly 16'. The drive axle system 10' is drivingly engaged with a power source 11'. As shown, the drive axle system 10' includes the three assemblies 612, 14', 16', but it is understood the drive axle system 10' may include fewer or more assemblies or components.

The power distribution unit 612 includes an input shaft 618, an inter-axle differential 619, a first output gear 620, a plurality of driving pinions 621, a transfer shaft 622, a second output gear 624, and a clutch 628. As shown, power distribution unit 612 includes the seven components 618, 619, 620, 621, 622, 624, 628 disposed in a housing 30' but it is understood the power distribution unit 612 may include fewer or more components.

The tandem drive axle system 10' includes the input shaft 618 at least partially disposed in the housing 30'. Preferably, the input shaft 618 is an elongate cylindrical member, however the input shaft 618 may be any other shape. Bearings 32' disposed between the input shaft 618' and the housing 30' and the input shaft 618 and the transfer shaft 622 permit the input shaft 618 to rotate about an axis of the input shaft 618. The input shaft 618 has a first end portion 633, having a first set of clutch teeth 637 formed thereon, a middle portion 634, and a second end portion 635, having a pinion carrier 636 disposed thereon.

The first end portion 633 has a diameter greater than a diameter of the middle portion 634. The first end portion 633 is a substantially disc shaped body drivingly coupled to the input shaft 618. Alternately, the first end portion 633 may be integrally formed with the input shaft 618. The first end portion 633 includes an engagement portion 638 formed therein adjacent an outer peripheral edge thereof. As shown, the engagement portion 638 is a conical surface oblique to the input shaft 618, however, the engagement portion 638 may have any other shape. The first set of clutch teeth 637 are formed on the first end portion 633 intermediate the input shaft 618 and the engagement portion 638.

The pinion carrier 636 is a substantially disc shaped body having a plurality of pinion supports 639 protruding therefrom adjacent a peripheral edge of the pinion carrier 636, however, the pinion carrier 636 may be any other rounded shape and may have a plurality of recesses or perforations formed therein. As is known in the art, the pinion carrier 636 is also known as a planet carrier.

The plurality of driving pinions 621 are rotatably coupled to the pinion supports 639. Each of the driving pinions 621 have gear teeth formed on an outer surface thereof. As is known in the art, each of the driving pinions 621 is also known as a planet gear. Preferably, bearings are disposed between each of the driving pinions 621 and the pinion supports 639, however, the driving pinions 621 may be directly mounted on the pinion supports 639.

The transfer shaft 622 is a hollow shaft concentrically disposed about the input shaft 618. Preferably, the transfer shaft 622 is a hollow elongate cylindrical member, however the transfer shaft 622 may be any other shape. Bearings 32' disposed between the transfer shaft 622 and the housing 30' and the input shaft 618 and the transfer shaft 622 permit the transfer shaft 622 to rotate about an axis of the transfer shaft 622. The axis of the transfer shaft 622 is concurrent with the axis of the input shaft 618. The transfer shaft 622 has a first end portion 643, having a first set of clutch teeth 644 formed on an outer surface thereof, and a second end portion 645, having a second set of gear teeth 646 formed on an outer surface thereof.

The first end portion 643 and the second end portion 645 are substantially disc shaped bodies having an outer diameter greater than a diameter of the transfer shaft 622. The first end portion 643 and the second end portion 645 are drivingly coupled to the transfer shaft 622. Alternately, the first end portion 643 and the second end portion 645 may be integrally formed with the transfer shaft 622 and may have a diameter substantially equal to the transfer shaft 622. Similarly, the first set of clutch teeth 644 and the second set of clutch teeth 646 may be formed directly in the transfer shaft 622. As is known in the art, the second end portion 645 having the clutch teeth 646 is known as a sun gear. The second set of clutch teeth 646 are engaged with the plurality of driving pinions 621 and the first set of clutch teeth 644 are disposed adjacent the first set of clutch teeth 637 of the input shaft 618.

The second output gear 624 is a gear concentrically disposed about the input shaft 618 and the transfer shaft 622. The second output gear 624 has a central perforation having a diameter greater than a diameter of the transfer shaft 622. The second output gear 624 is a substantially disc shaped body having a first end portion 647, a second end portion 648 defining an outer diameter of the second output gear 624, and an engagement portion 649. Bearings (not shown) disposed between the transfer shaft 622 and the second output gear 624 permit the second output gear 624 to rotate about an axis of the second output gear 624. The axis of the second output gear 624 is concurrent with the axis of the input shaft 618. A first set of clutch teeth 650 are formed on the first end portion 647 adjacent the first set of clutch teeth 644 of the transfer shaft 622. A second set of gear teeth 651 are formed on the second end portion 648.

The engagement portion 649 is formed in the second output gear 624 intermediate the first end portion 647 and the second end portion 648. As shown, the engagement portion 649 is a conical surface oblique to the input shaft 618; however, the engagement portion 649 may have any other shape.

The clutch 628 is a shift collar concentrically disposed about the input shaft 618 and the transfer shaft 622. The clutch 628 includes a set of inner clutch collar teeth 652 formed on an inner surface thereof, a first synchronizer 653, and a second synchronizer 654. The set of inner clutch collar teeth 652 are engaged with the first set of clutch teeth 644 of the transfer shaft 622. The clutch 628 can be slidably moved along the axis of the input shaft 618 as directed automatically by the controller 55' while maintaining engagement of the inner clutch collar teeth 652 and the first set of clutch teeth 644. A shift fork 56' disposed in an annular recess formed in the clutch 628 moves the clutch 628 along the axis of the input shaft 618 into a first position, a second position, or a third position. The first actuator 57', which is drivingly engaged with the shift fork 56', is engaged to position the shift fork 56' as directed manually by the controller 55'. Consequently, the shift fork 56' positions the clutch 628 into the first position, the second position, or the third position. In the first position, the clutch 628 is drivingly engaged with the first set of clutch teeth 644 of the transfer shaft 622 and the first set of clutch teeth 637 of the input shaft 618. In the second position, the clutch 628 is drivingly engaged with the first set of clutch teeth 644 of the transfer shaft 622 and the first set of clutch teeth 650 of the second output gear 624. In the third position, the inner clutch collar teeth 652 of the clutch 628 are only drivingly engaged with the first set of clutch teeth 644 of the transfer shaft 622. It is understood the clutch 628, the clutch teeth 637, 644, 650, 652, the synchronizers 653, 654, and the engagement portions 638, 649 may be substituted with any clutching device that permits selective engagement of a driving and a driven part.

The first synchronizer 653 is an annular body coupled to the clutch 628 adjacent the first end portion 633 of the input shaft 618. The first synchronizer 653 has a first conical engagement surface 658. Alternately, the first synchronizer 653 may have an engagement surface having any other shape. When the clutch 628 is moved from the third position towards the first position, the first conical engagement surface 658 contacts the engagement portion 638 of the first end portion 633 of the input shaft 618, causing the clutch 628 to act upon the input shaft 618. When the clutch 628 is moved towards the first set of clutch teeth 637 of the input shaft 618, the clutch 628 continues to act upon the input shaft 618 as the inner clutch collar teeth 652 become drivingly engaged with the first set of clutch teeth 644 of the transfer shaft 622 and the first set of clutch teeth 637 of the input shaft 618.

The second synchronizer 654 is an annular body coupled to the clutch 628 adjacent the first end portion 647 of the second output gear 624. The second synchronizer 654 has a second conical engagement surface 659. Alternately, the second synchronizer 654 may have an engagement surface having any other shape. When the clutch 628 is moved from the third position into the second position, the second conical engagement surface 659 contacts the engagement portion 649 of the first end portion 647 of the second output gear 624. When the clutch 628 is moved further towards the first set of clutch teeth 650 of the second output gear 624, the clutch 628 continues to act upon the second output gear 624 as the inner clutch collar teeth 652 become drivingly engaged with the first set of clutch teeth 644 of the transfer shaft 622 and the first set of clutch teeth 650 of the second output gear 24.

The first output gear 620 is a gear concentrically disposed about the input shaft 618 and the pinion carrier 636. The first output gear 620 has a central recess having a diameter greater than an outer diameter of the pinion carrier 636. The first output gear 620 is a substantially cup shaped body having an inner surface having gear teeth 640 formed on. As is known in the art, the first output gear 620 is known as a ring gear. The gear teeth 640 are engaged with the gear teeth formed on the outer surface of each of the driving pinions 621.

The first output gear 620 includes an output shaft 641 drivingly coupled thereto. Alternately, the first output gear 620 may be integrally formed with the output shaft 641. The output shaft 641 is collinear with the input shaft 618. Bearings 32' disposed between the output shaft 641 and the housing 30' support the first output gear 620 and permit the output shaft 641 to rotate about an axis of the output shaft 641.

An axle clutch 668 is a shift collar having a conical engagement surface that divides one of the second output axle shafts 67' into first and second portions. Alternately, the axle clutch 668 may be a plate style clutch or any other style of friction clutch. The axle clutch 668 has a plurality of teeth formed thereon for selectively engaging corresponding teeth formed on the first portion and the second portion of the second output axle shafts 67'. The axle clutch 668 is urged into an engaged position or a disengaged position by a shift fork 73'. A second actuator 74', which is drivingly engaged with the shift fork 73', is engaged to position the shift fork 73', and thus the axle clutch 668, as directed by the controller 55'. When the axle clutch 668 is in the engaged position, the first portion of one of the second output axle shafts 67' is drivingly engaged with the second portion of one of the second output axle shafts 67'.

The axle clutch 668 may be selectively engaged to impart energy to a lubricant disposed within the second axle housing 69'. Preferably, when the axle clutch 668 is used to impart energy to the lubricant disposed within the second axle housing 69', the axle clutch 668 is a clutch capable of acting upon on a connecting component in a variable manner, such as a shift collar having a conical engagement surface. When the axle clutch 668 is used to impart energy to the lubricant disposed within the second axle housing 69', the controller 55' one of engages and partially engages the axle clutch 668 until a temperature of the second axle assembly 16' is above a predetermined value. As a non-limiting example, the predetermined value may be about 20° Fahrenheit.

The axle clutch 668 and the clutch 628 may be simultaneously used to impart energy to the lubricant disposed within the second axle housing 69'. When the axle clutch 668 and the clutch 628 are simultaneously used to impart energy to the lubricant disposed within the second axle housing, the axle clutch 668 cooperates with the clutch 628 to adjust the rotational speed of the second output gear 624, the driven gear 70', the inter-axle shaft 64', the second driving gear 65', and the second wheel differential 66' to one of the predetermined speed and a target speed.

In use, the method for use of the drive axle system 10' facilitates shifting from the first operating state to the second operating state. Similarly, the shifting procedures described above for use with the drive axle system 10, may be used with the drive axle system 10', accommodating for the differences of the embodiment shown in FIG. 6 as described hereinabove.

In accordance with the provisions of the patent statutes, the present invention has been described in what is considered to represent its preferred embodiments. However, it should be noted that the invention can be practiced otherwise than as specifically illustrated and described without departing from its spirit or scope.

What is claimed is:

1. A method of shifting a power distribution unit for a vehicle from a first operating state to a second operating state, the method comprising the steps of:
drivingly engaging a first axle assembly with a first output of the power distribution unit;
drivingly engaging a second axle assembly with a second output of the power distribution unit;
drivingly engaging an input of the power distribution unit with an output of a power source, the power distribution unit including an inter-axle differential, the first output, the second output, and a first clutching device having a first position and a second position, the first clutching device in the first position locking the inter-axle differential, engaging the first output with the input of the power distribution unit, and disengaging the second output from the inter-axle differential, the first clutching device in the second position unlocking the inter-axle differential and engaging the first output and the second output with the inter-axle differential;
placing the first clutching device in one of the first position and the second position;
applying a rotational force to the input of the power distribution unit;
adjusting the rotational force transferred to the power distribution unit to facilitate moving the first clutching device;
moving the first clutching device from one of the first position and the second position to a third position, the first clutching device in the third position neither locking the inter-axle differential nor engaging the second output with the inter-axle differential;
adjusting a rotational speed of the input of the power distribution unit to facilitate moving the first clutching device from the third position;
moving the first clutching device from the third position to one of the first and second positions; and
adjusting the rotational force transferred to the power distribution unit.

2. The method according to claim 1, wherein the inter-axle differential is a planetary differential comprising a carrier drivingly engaged with the input of the power distribution unit, a plurality of driving pinions rotatably disposed on the carrier, a ring gear drivingly engaged with the first output of the power distribution unit, and a sun gear selectively drivingly engaged with the second output of the power distribution unit.

3. The method according to claim 2, wherein the first clutching device comprises a shift collar in splined engagement with a portion of the sun gear, a first synchronizer, and a second synchronizer, the first synchronizer acting upon the carrier as the first clutching device is moved towards the first position and the second synchronizer acting upon the second output as the first clutching device is moved towards the second position.

4. The method according to claim 2, wherein the first clutching device comprises a shift collar in splined engagement with a portion of the sun gear and a synchronizer, the synchronizer acting upon the second output as the first clutching device is moved towards the second position.

5. The method according to claim 2, further comprising the step of providing a controller in communication with a first clutching device actuator and at least one sensor, the at least one sensor for monitoring at least one of an operating condition of the power source, a temperature of the second axle assembly, a speed of the sun gear, a speed of the second output gear, a speed of a portion of the second axle assembly, an amount of the rotational force transferred to the power distribution unit, a position of a second clutching device for selectively disengaging a first portion of the second axle assembly from a second portion of the second axle assembly, and a position of the first clutching device to adjust at least one of the operating condition of the power source, the position of the first clutching device and the second clutching device, and a duration between successive positions of the first clutching device based on at least one of the operating condition of the power source, the temperature of the second axle assembly, the speed of the sun gear, a speed of the second output gear, a speed of a portion of the second axle assembly, the amount of the rotational force transferred to the power distribution unit, and the position of the first clutching device and the second clutching device.

6. The method according to claim 1, wherein the step of one of adjusting the rotational force transferred to the power distribution unit may be performed by adjusting an operating condition of the power source.

7. The method according to claim 1, wherein following the step of moving the first clutching device from one of the first position and the second position, the step of adjusting the rotational speed of the input of the power source is performed by adjusting an operating condition of the power source is adjusted.

8. The method according to claim 1, wherein the first output is a first output gear and the second output is a second output gear.

9. The method according to claim 1, wherein the first clutching device is selectively engaged to adjust a rotational speed of a portion of the second axle assembly.

10. The method according to claim 1, further comprising the step of moving the first clutching device from the third position to the second position when a temperature of the second axle assembly is above a predetermined value.

11. The method according to claim 1, wherein following the step of moving the first clutching device to the third position, the step of adjusting the rotational speed of the input of the power distribution unit is performed by adjusting a rotational speed of the power source.

12. The method according to claim 11, further comprising the step of maintaining a substantially constant rotational speed of the power source once one of a predetermined speed and a target speed is obtained and moving the first clutching device from the third position to one of the first and second positions.

13. The method according to claim 12, wherein one of the predetermined speed and the target speed of the power source causes a sun gear forming a portion of the inter-axle differential and the second output to rotate at speeds permitting meshing engagement therebetween with the first clutching device.

14. The method according to claim 1, wherein the second axle assembly further includes a second clutching device, the second clutching device selectively disengaging a first portion of the second axle assembly from a second portion of the second axle assembly.

15. The method according to claim 14, wherein the step of moving the first clutching device from the third position to the second position partially engages the second output and the first portion of the second axle assembly to adjust a rotational speed of the second output and the first portion of the second axle assembly to one of a target speed and an idle condition, the target speed facilitating engagement between the first portion of the second axle assembly and the second portion of the second axle assembly with the second clutching device.

16. The method according to claim 14, wherein the second clutching device is selectively engaged to impart energy to a lubricant disposed within the second axle assembly.

17. The method according to claim 16, further comprising the step of engaging the second clutching device when a temperature of the second axle assembly is above a predetermined value.

18. The method according to claim 14, wherein the first clutching device and the second clutching device are simultaneously engaged to adjust a rotational speed of a portion of the second axle assembly.

19. A method of shifting a power distribution unit for a vehicle from a first operating state to a second operating state, the method comprising the steps of:
drivingly engaging a first axle assembly with a first output of the power distribution unit;
drivingly engaging a second axle assembly with a second output of the power distribution unit;
drivingly engaging an input of the power distribution unit with an output of a power source, the power distribution unit including an inter-axle differential, the first output, the second output, and a first clutching device having a first position and a second position, the first clutching device in the first position locking the inter-axle differential, engaging the first output with the input of the power distribution unit, and disengaging the second output from the inter-axle differential, the first clutching device in the second position unlocking the inter-axle differential and engaging the first output and the second output with the inter-axle differential;
placing the first clutching device in the first position;
applying a rotational force to the input of the power distribution unit;
one of reducing and interrupting the rotational force transferred to the power distribution unit;
moving the first clutching device from the first position to a third position, the first clutching device in the third position unlocking the inter-axle differential;
adjusting a rotational speed of the input of the power distribution unit to facilitate moving the first clutching device from the third position;
adjusting a rotational speed of a first portion of the second axle assembly to a target speed, the target speed facilitating engagement between the first portion of the second axle assembly and a second portion of the second axle assembly;
moving the first clutching device from the third position to the second position; and
one of increasing and resuming the rotational force transferred to the power distribution unit.

20. The method according to claim 19, wherein the inter-axle differential is a planetary differential comprising a carrier drivingly engaged with the input of the power distribution unit, a plurality of driving pinions rotatably disposed on the carrier, a ring gear drivingly engaged with the first output of the power distribution unit, and a sun gear selectively drivingly engaged with the second output of the power distribution unit.

21. The method according to claim 20, wherein the first clutching device comprises a shift collar in splined engagement with a portion of the sun gear, a first synchronizer, and a second synchronizer, the first synchronizer acting upon the carrier as the first clutching device is moved towards the first position and the second synchronizer acting upon the second output as the first clutching device is moved towards the second position.

22. The method according to claim 20, wherein the first clutching device comprises a shift collar in splined engagement with a portion of the sun gear and a synchronizer, the synchronizer acting upon the second output as the first clutching device is moved towards the second position.

23. The method according to claim 20, further comprising the step of providing a controller in communication with a first clutching device actuator and at least one sensor, the at least one sensor for monitoring at least one of an operating condition of the power source, a temperature of the second axle assembly, a speed of the sun gear, a speed of the second output gear, a speed of a portion of the second axle assembly, an amount of the rotational force transferred to the power distribution unit, a position of a second clutching device for selectively disengaging the first portion of the second axle assembly from the second portion of the second axle assembly, and a position of the first clutching device to adjust at least one of the operating condition of the power source, the position of the first clutching device and the second clutching device, and a duration between successive positions of the first clutching device based on at least one of the operating condition of the power source, the temperature of the second axle assembly, the speed of the sun gear, a speed of the second output gear, a speed of a portion of the second axle assembly, the amount of the rotational force transferred to the power distribution unit, and the position of the first clutching device and the second clutching device.

24. The method according to claim 19, wherein the step of one of reducing and interrupting the rotational force transferred to the power distribution unit may be performed by adjusting an operating condition of the power source.

25. The method according to claim 19, wherein following the step of moving the first clutching device from the first position to the third position, the step of adjusting the rotational speed of the input of the power distribution unit is performed by adjusting an operating condition of the power source.

26. The method according to claim 19, wherein the first output is a first output gear and the second output is a second output gear.

27. The method according to claim 19, wherein the step of adjusting a rotational speed of a first portion of the second axle assembly is performed by selectively engaging the first clutching device.

28. The method according to claim 19, further comprising the step of moving the first clutching device from the third position to the second position when a temperature of the second axle assembly is above a predetermined value.

29. The method according to claim 19, wherein following the step of moving the first clutching device to the third position, the step of adjusting the rotational speed of the input of the power distribution unit is performed by adjusting a rotational speed of the power source.

30. The method according to claim 29, further comprising the step of maintaining a substantially constant rotational speed of the power source once one of a predetermined speed and a target speed is obtained and moving the first clutching device from the third position to the second position.

31. The method according to claim 30, wherein one of the predetermined speed and the target speed of the power source causes a sun gear forming a portion of the inter-axle differential and the second output to rotate at speeds permitting meshing engagement therebetween with the first clutching device.

32. The method according to claim 19, wherein the second axle assembly further includes a second clutching device, the second clutching device selectively disengaging the first portion of the second axle assembly from the second portion of the second axle assembly.

33. The method according to claim 32, wherein the step of moving the first clutching device from the third position to the second position partially engages the second output and the first portion of the second axle assembly to adjust a rotational speed of the second output and the first portion of the second axle assembly to the target speed, the target speed facilitating engagement between the first portion of the second axle assembly and the second portion of the second axle assembly with the second clutching device.

34. The method according to claim 32, wherein the second clutching device is selectively engaged to impart energy to a lubricant disposed within the second axle assembly.

35. The method according to claim 34, further comprising the step of engaging the second clutching device when a temperature of the second axle assembly is above a predetermined value.

36. The method according to claim 32, wherein the first clutching device and the second clutching device are simultaneously engaged to adjust a rotational speed of a portion of the second axle assembly.

37. A method of shifting a power distribution unit for a vehicle from a first operating state to a second operating state, the method comprising the steps of:
providing a first axle assembly including a first pair of output axle shafts, a first differential drivingly engaged with the first pair of output axle shafts, and a first driving gear coupled to the first differential, the first axle assembly having a first gear ratio;
providing a second axle assembly including a second pair of output axle shafts, a second differential selectively drivingly engaged with the second pair of output axle shafts, a second driving gear coupled to the second differential, and an inter-axle shaft drivingly engaged with the second driving gear, the second axle assembly having a second gear ratio;
drivingly engaging an input of the power distribution unit with an output of a power source, the power distribution unit including an inter-axle differential, a first output drivingly engaged with the first driving gear, a second output drivingly engaged with the inter-axle shaft, and a first clutching device having a first position and a second position, the first clutching device in the first position locking the inter-axle differential, engaging the first output with the input of the power distribution unit, and disengaging the second output from the inter-axle differential, the first clutching device in the second position unlocking the inter-axle differential and engaging the first output and the second output with the inter-axle differential;
placing the first clutching device in the first position;
applying a rotational force to the input of the power distribution unit;
one of reducing and interrupting the rotational force transferred to the power distribution unit;
moving the first clutching device from the first position to a third position, the first clutching device in the third position neither locking the inter-axle differential nor engaging the second output with the inter-axle differential;
adjusting a rotational speed of the input of the power distribution unit to facilitate moving the first clutching device from the third position;
adjusting a rotational speed of the second output, the inter-axle shaft, the second driving gear, and the second differential to a target speed, the target speed facilitating engagement between the second differential and the second pair of output axle shafts;
moving the first clutching device from the third position to the second position, the first clutching device in the second position engaging the second output with the inter-axle shaft, the second driving gear, and the second differential;
one of increasing and resuming the rotational force transferred to the power distribution unit;
distributing the rotational force between the first output and the second output through the inter-axle differential; and
accommodating a rotational difference of the first output and the second output caused by a difference between the first gear ratio and the second gear ratio with the inter-axle differential, wherein the accommodating of the rotational difference between the first output and the second output provides a cumulative gear ratio for the first axle assembly and the second axle assembly, the cumulative gear ratio intermediate the first gear ratio and the second gear ratio.

38. The method according to claim 37, wherein the second gear ratio is different from the first gear ratio.

39. The method according to claim 37, wherein the second axle assembly further includes a second clutching device, the second clutching device selectively disengaging a portion of one of the second pair of output axle shafts from a remaining portion of the one of the second pair of output axle shafts.

40. The method according to claim 39, wherein the inter-axle differential is a planetary differential comprising a carrier drivingly engaged with the input of the power distribution unit, a plurality of driving pinions rotatably disposed on the carrier, a ring gear drivingly engaged with the first output of the power distribution unit, and a sun gear selectively drivingly engaged with the second output of the power distribution unit.

41. The method according to claim 40, wherein the first clutching device comprises a shift collar in splined engagement with a portion of the sun gear, a first synchronizer, and a second synchronizer, the first synchronizer acting upon the carrier as the first clutching device is moved towards the first position and the second synchronizer acting upon the second output as the first clutching device is moved towards the second position.

42. The method according to claim 41, wherein the rotational speed of the second output, the inter-axle shaft, the second driving gear, and the second differential are adjusted to the target speed as the first clutching device is moved towards the second position, a concurrent rotation of the carrier and the ring gear driving the sun gear through the plurality of driving pinions to adjust the rotational speed of the second output, the inter-axle shaft, the second driving gear, and the second differential, the second clutching device placed in an engaged position when the rotational speed of the second output, the inter-axle shaft, the second driving gear, and the second differential are adjusted to the target speed.

43. A method of shifting a power distribution unit for a vehicle from a first operating state to a second operating state, the method comprising the steps of:
drivingly engaging a first axle assembly with an output of the power distribution unit;
drivingly engaging an input of the power distribution unit with an output of a power source, the power distribution unit including the output and a first clutching device having a first position and a second position, the first clutching device in the first position engaging the output with the input of the power distribution unit and disengaging a portion of the power distribution unit, the first clutching device in the second position engaging the output;

placing the first clutching device in one of the first position and the second position;

applying a rotational force to the input of the power distribution unit;

adjusting the rotational force transferred to the power distribution unit to facilitate moving the first clutching device;

moving the first clutching device from one of the first position and the second position to a third position;

adjusting a rotational speed of the input of the power distribution unit to facilitate moving the first clutching device from the third position; and moving the first clutching device from the third position to one of the first and second positions.

44. A method of shifting a power distribution unit for a vehicle from a first operating state to a second operating state, the method comprising the steps of:

drivingly engaging a first axle assembly with a first output of the power distribution unit;

drivingly engaging a second axle assembly with a second output of the power distribution unit, the second axle assembly including an axle clutch, the axle clutch selectively disengaging a portion of one of a second pair of output axle shafts from a remaining portion of the one of the second pair of output axle shafts drivingly engaging an input of the power distribution unit with an output of a power source, the power distribution unit including an inter-axle differential, the first output, the second output, and a first clutching device having a first position and a second position, the first clutching device in the first position locking the inter-axle differential, engaging the first output with the input of the power distribution unit, and disengaging the second output from the inter-axle differential, the first clutching device in the second position unlocking the inter-axle differential and engaging the first output and the second output with the inter-axle differential;

placing the first clutching device in the first position;

applying a rotational force to the input of the power distribution unit;

adjusting the rotational force transferred to the power distribution unit to facilitate moving the first clutching device;

moving the first clutching device from the first position to a third position, the first clutching device in the third position neither locking the inter-axle differential nor engaging the second output with the inter-axle differential;

imparting energy to a lubricant disposed within the second axle assembly by selectively engaging the axle clutch;

adjusting a rotational speed of the input of the power distribution unit to facilitate moving the first clutching device from the third position;

moving the first clutching device from the third position to the second position; and adjusting the rotational force transferred to the power distribution unit.

* * * * *